US011444874B2

(12) United States Patent
Ren et al.

(10) Patent No.: US 11,444,874 B2
(45) Date of Patent: Sep. 13, 2022

(54) PACKET TRANSMISSION METHOD, AND COMMUNICATIONS APPARATUS AND SYSTEM

(71) Applicant: Huawei Technologies Co., Ltd., Shenzhen (CN)

(72) Inventors: Shoushou Ren, Beijing (CN); Delei Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 17/103,297

(22) Filed: Nov. 24, 2020

(65) Prior Publication Data

US 2021/0083977 A1 Mar. 18, 2021

Related U.S. Application Data

(63) Continuation of application No. PCT/CN2019/088397, filed on May 24, 2019.

(30) Foreign Application Priority Data

May 25, 2018 (CN) ......................... 201810516567.2

(51) Int. Cl.
*H04L 45/748* (2022.01)
*H04L 69/04* (2022.01)
(Continued)

(52) U.S. Cl.
CPC ............ *H04L 45/748* (2013.01); *H04L 69/04* (2013.01); *H04L 69/16* (2013.01); *H04L 69/22* (2013.01)

(58) Field of Classification Search
CPC ....... H04L 45/748; H04L 69/04; H04L 69/16; H04L 69/22
See application file for complete search history.

(56) References Cited

U.S. PATENT DOCUMENTS

2009/0185549 A1 7/2009 Shon et al.
2013/0028095 A1 1/2013 Vasseur et al.
(Continued)

FOREIGN PATENT DOCUMENTS

CN 1909518 A 2/2007
CN 101645823 A 2/2010
(Continued)

OTHER PUBLICATIONS

IEEE Std 802.15.4™-2015, "IEEE Standard for Low-Rate Wireless Networks", Dec. 5, 2015, 708 pages.
(Continued)

*Primary Examiner* — Samina F Choudhry
(74) *Attorney, Agent, or Firm* — Slater Matsil, LLP

(57) ABSTRACT

Embodiments of this application provide a packet transmission method, and a communications apparatus and system. The method includes: generating a packet based on address information of forwarding nodes on a packet forwarding path, where the packet includes a first indication field, the first indication field is used to indicate a compressed first element and a compressed second element, the first element and the second element are address information of different forwarding nodes, and different address compression manners are used for the first element and the second element; and sending the packet.

20 Claims, 11 Drawing Sheets

(51) Int. Cl.
*H04L 69/16* (2022.01)
*H04L 69/22* (2022.01)

(56) References Cited

U.S. PATENT DOCUMENTS

| | | | |
|---|---|---|---|
| 2014/0105098 | A1 | 4/2014 | Chu et al. |
| 2015/0003458 | A1 | 1/2015 | Li et al. |
| 2016/0088517 | A1 | 3/2016 | Akyurek et al. |

FOREIGN PATENT DOCUMENTS

| | | | | |
|---|---|---|---|---|
| CN | 101854361 | A | 10/2010 | |
| CN | 102118356 | A | 7/2011 | |
| CN | 103152770 | A | 6/2013 | |
| CN | 104168151 | A | 11/2014 | |
| CN | 104506439 | A | 4/2015 | |
| CN | 105743790 | A | 7/2016 | |
| CN | 106656781 | A | 5/2017 | |
| KR | 20100105086 | A | 9/2010 | |
| WO | 2009036792 | A1 | 3/2009 | |
| WO | WO-2009036792 | A1 * | 3/2009 | ............ H04L 45/34 |

OTHER PUBLICATIONS

Hui, J. et al., "An IPv6 Routing Header for Source Routes with the Routing Protocol for Low-Power and Lossy Networks (RPL)", Internet Engineering Task Force (IETF), Request for Comments: 6554, Mar. 2012, 13 pages.

Ishaq, I. et al., "IETF Standardization in the Field of the Internet of Things (IoT): A Survey", Journal of Sensor and Actuator Networks, Apr. 25, 2013, 54 pages.

Rong, Xiao et al., "Address Compression for Hierarchical Forwarding Architecture in IPv6 IoT", Journal of Computer Research and Development, DOI:10.7544/issn1000-1239, Feb. 4, 2016, 11 pages.

* cited by examiner

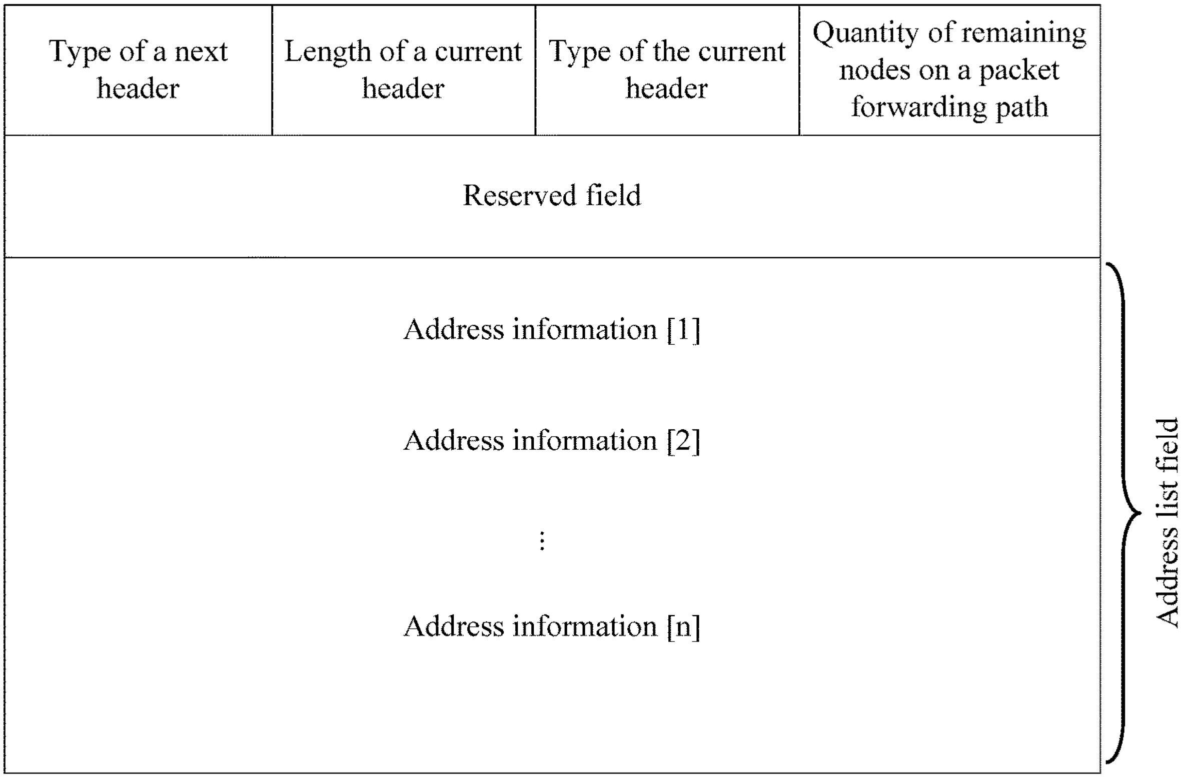

FIG. 2

Generate a packet based on address information of forwarding nodes on a packet forwarding path, where the packet includes a first indication field, the first indication field is used to indicate a compressed first element and a compressed second element, a first element and a second element are address information of different forwarding nodes, and different address compression manners are used for the first element and the second element ~ S101

Send the packet ~ S102

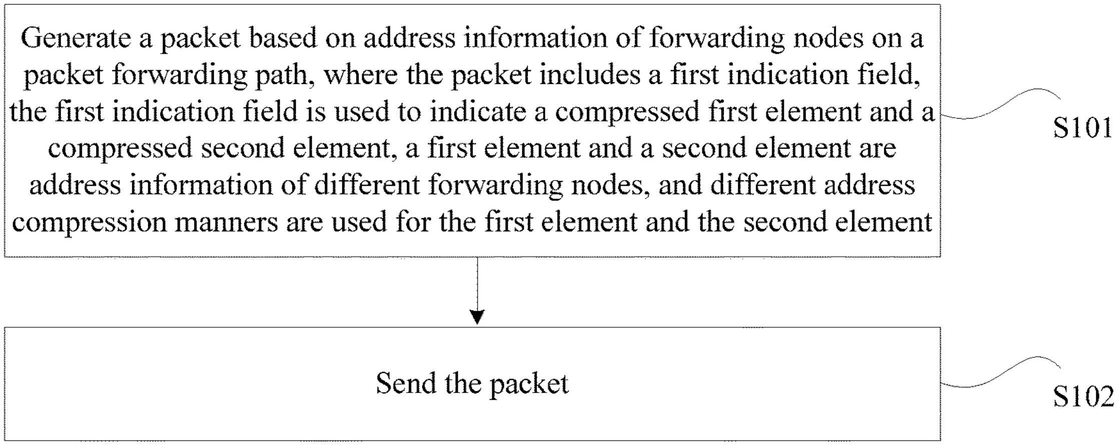

FIG. 3

| Type of a next header | Length of a current header | Seventh indication field | Quantity of remaining nodes on a packet forwarding path |
|---|---|---|---|
| Second field of a second indication field | Fifth indication field | Fourth indication field | First field 1 of the second indication field | First field 2 of the second indication field | Sixth indication field |
| Third indication field ||||||
| First indication field ||||||

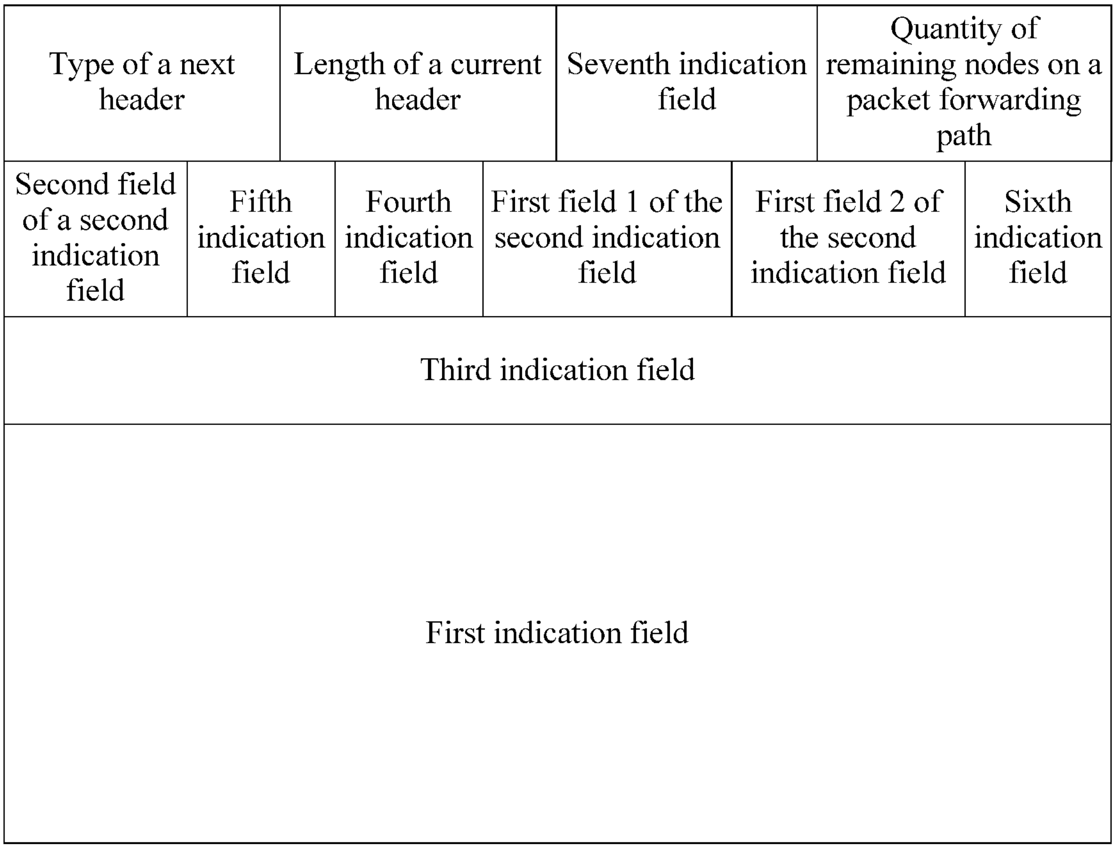

FIG. 4

| Type of a next header | Length of a current header | Seventh indication field | Quantity of remaining nodes on a packet forwarding path |
|---|---|---|---|
| Fifth indication field || Fourth indication field | Sixth indication field |
| Third indication field ||||
| Second indication field corresponding to an element 1 + Element 1 indicated by a first indication field ||||
| Second indication field corresponding to an element 2 + Element 2 indicated by the first indication field ||||
| ⋮ ||||
| Second indication field corresponding to an element n + Element n indicated by the first indication field ||||

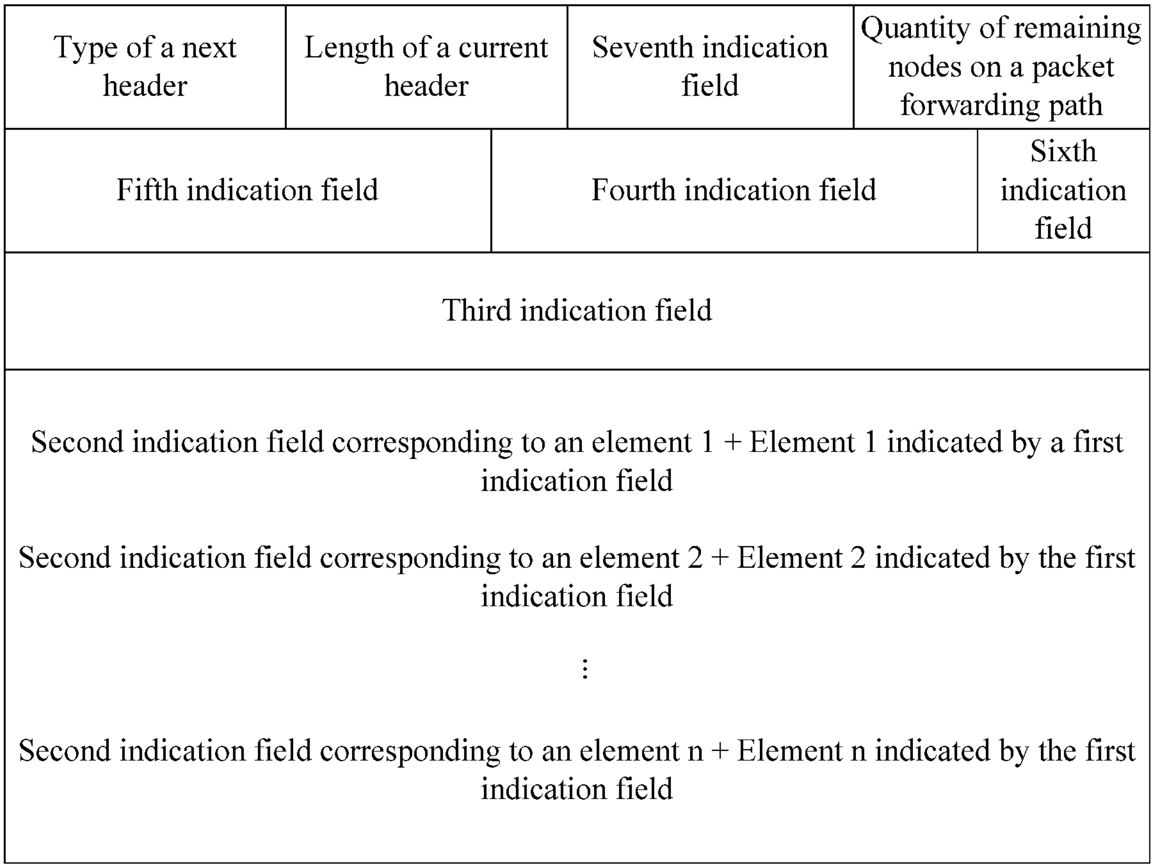

FIG. 5

<table>
<tr><td colspan="2">Type of a next header</td><td colspan="2">Length of a current header</td><td colspan="2">Seventh indication field</td><td>Quantity of remaining nodes on a packet forwarding path</td></tr>
<tr><td>Fifth indication field</td><td>Fourth indication field</td><td>First field 1 of a second indication field</td><td>First field 2 of the second indication field</td><td>...</td><td>First field X of the second indication field</td><td>Sixth indication field</td></tr>
<tr><td colspan="7">Third indication field</td></tr>
<tr><td colspan="7">First indication field</td></tr>
</table>

FIG. 6

<table>
<tr><td colspan="2">Type of a next header</td><td colspan="2">Length of a current header</td><td>100</td><td>8</td></tr>
<tr><td>0b11</td><td>Fifth indication field</td><td>Fourth indication field</td><td colspan="2">0b11100011</td><td>0b00011000</td></tr>
<tr><td colspan="6"><0b11100111,0xFC00:0000:0000:5678:1234:1234:12></td></tr>
<tr><td colspan="6"><0b0,0b0011000,0x0F1234><br><0b0,0b0011000,0x34AB12><br><0b0,0b0011000,0xCDABCD><br><0b001,0b0011000,0x34:1234><br><0b001,0b0011000,0x34:AB12><br><0xFC00::AAAA:1234:1234:1278:AB12><br><0b1,0b0011000,0xl41234><br><0b1,0b0011000,0xlAABEE><br><br>0xFC00::4567:1234:12FF:FE1A:ABEF</td></tr>
</table>

FIG. 8

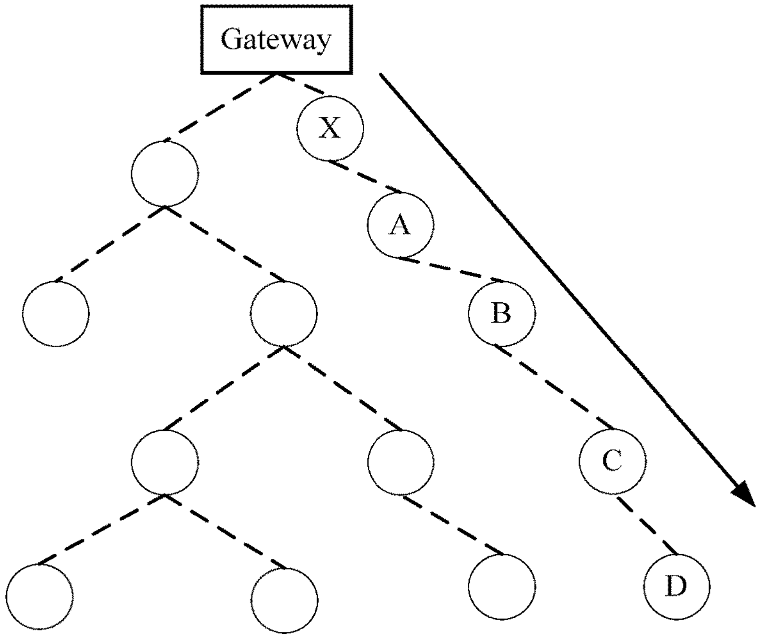

FIG. 9

<table>
<tr><td colspan="2">Type of a next header</td><td colspan="2">Length of a current header</td><td>100</td><td>3</td></tr>
<tr><td>0b10</td><td>Fifth indication field</td><td>Fourth indication field</td><td colspan="2">0b111</td><td>First field corresponding to an address compression manner 1</td></tr>
<tr><td colspan="6">Third indication field</td></tr>
<tr><td colspan="6"><0b0,0b0001000,0b00001111><br><0b0,0b0001100,0b000100001010><br><0b0,0b0010000,0b0001111111110000><br><0xFC00::AABEF></td></tr>
</table>

FIG. 10

PACKET TRANSMISSION METHOD, AND COMMUNICATIONS APPARATUS AND SYSTEM

CROSS-REFERENCE TO RELATED APPLICATIONS

This application is a continuation of International Application No. PCT/CN2019/088397, filed on May 24, 2019, which claims priority to Chinese Patent Application No. 201810516567.2, filed on May 25, 2018. The disclosures of the aforementioned applications are hereby incorporated by reference in their entireties.

TECHNICAL FIELD

Embodiments of this application relate to communications technologies, and in particular, to a packet transmission method, and a communications apparatus and system.

BACKGROUND

The internet of things (IoT) is the Internet of things connected to each other. In an IoT network, information exchange and communication between things can be performed through the Internet, to implement intelligent identification, positioning, tracking, monitoring, management, and the like. Things in the IoT may be referred to as nodes. In most IoT scenarios, there are a relatively large quantity of nodes, typically in the hundreds or even thousands. A node plays a role of both receiving and forwarding data. That is, a node not only receives and processes a message that is sent by an IoT management platform to the node, but also undertakes a task of forwarding data between a subnode and the management platform.

Because a storage capacity of a node is limited, a scale of a routing table that the node can store is greatly limited. Therefore, in an IoT scenario, an internet protocol (IP) source routing technology for interconnection between networks is usually used to guide a node in packet forwarding. Source routing means that a packet forwarding path is specified by a source node. For example, the internet protocol version 6 (IPv6) protocol is used for packet transmission. In this case, a source node may specify a forwarding path of a packet by adding, in an address list field of an extension header of the packet, address information (that is, an IPv6 address) of some or all forwarding nodes through which the packet should pass. Correspondingly, a node receiving the packet may forward the packet based on the forwarding node address information carried in the address list field. The forwarding node herein is a node that undertakes a task of forwarding data between a subnode and a management platform in the IoT scenario. In an address list field, address information of one forwarding node may be referred to as one element of the address list field.

However, relatively long address information (which occupies 128 bits) greatly limits a quantity of elements in an address list field, that is, limits a quantity of forwarding nodes that can be specified by a source node. This brings some difficulty in network deployment.

SUMMARY

Embodiments of this application provide a packet transmission method, and a communications apparatus and system, to resolve a technical problem that, when the IPv6 protocol is used for packet transmission, network deployment is difficult because a quantity of elements in an address list field is greatly limited due to relatively long address information (which occupies 128 bits) of each forwarding node.

According to a first aspect, an embodiment of this application provides a packet transmission method. The method may be applied to a compression node, or may be applied to a chip in a compression node. The following describes the method by using an example in which the method is applied to a compression node. The method includes: generating a packet based on address information of forwarding nodes on a packet forwarding path, where the packet includes a first indication field, the first indication field is used to indicate a compressed first element and a compressed second element, the first element and the second element are address information of different forwarding nodes, and different address compression manners are used for the first element and the second element; and sending the packet.

According to the packet transmission method provided in the first aspect, when the IPv6 protocol is used for packet transmission, and an IP source routing technology is used to guide the forwarding nodes on the packet forwarding path in packet forwarding, different address compression manners may be used to compress address information of forwarding nodes that has different compression characteristics, so as to compress address information of more forwarding nodes to the maximum extent, so that lengths of compressed address information of the forwarding nodes are each less than 128 bits, and IP source routing is implemented by indicating the compressed address information by using the first indication field of the packet. In this way, when a length of the packet remains unchanged, a quantity of indicated elements can be increased. This can increase a quantity of forwarding nodes that can be specified, thereby reducing difficulty in network deployment.

In a possible design, the address information of the forwarding nodes on the packet forwarding path is an address information set, address information of each forwarding node is one element, the address information set includes at least two first subsets, each first subset includes at least two elements, and a common prefix shared by the elements in the first subset is a prefix of the first subset; and that different address compression manners are used for the first element and the second element includes: the first element and the second element belong to different first subsets, and a prefix of a first subset to which the first element belongs is different from a prefix of a first subset to which the second element belongs; an address compression manner used for the first element is: eliminating, from the first element, a portion that is the same as the prefix of the first subset to which the first element belongs, to obtain the compressed first element; and an address compression manner used for the second element is: eliminating, from the second element, a portion that is the same as the prefix of the first subset to which the second element belongs, to obtain the compressed second element.

According to the packet transmission method provided in this possible design, different address compression manners can be used to compress elements that have different compression characteristics, so as to compress a length of each element to a greater extent, and compress more elements to a greater extent. In this way, when indicating compressed elements by using the first indication field of the packet, the compression node can indicate more elements by using the first indication field, with a given length of the first indication field. This can increase a quantity of forwarding nodes that can be specified, thereby reducing difficulty in network deployment.

In a possible design, the first indication field is further used to indicate a compressed third element, the third element is address information of a forwarding node, and an address compression manner used for the third element is different from that used for each of the first element and the second element; the address information set further includes a second subset, the second subset includes at least one element, the element included in the second subset is different from the elements included in the first subset, and a prefix of each element in the second subset is the same as that of address information of a source node or address information of a destination node; and that an address compression manner used for the third element is different from that used for each of the first element and the second element includes: the third element belongs to the second subset; and the address compression manner used for the third element is: eliminating, from the third element, a portion that is the same as the prefix of the address information of the source node, to obtain the compressed third element; or eliminating, from the third element, a portion that is the same as the prefix of the address information of the destination node, to obtain the compressed third element.

According to the packet transmission method provided in this possible design, different address compression manners can be used to compress elements that have different compression characteristics, so as to compress a length of each element to a greater extent, and compress more elements to a greater extent. In this way, when indicating compressed elements by using the first indication field of the packet, the compression node can indicate more elements by using the first indication field, with a given length of the first indication field. This can increase a quantity of forwarding nodes that can be specified, thereby reducing difficulty in network deployment.

In a possible design, the first indication field is further used to indicate a compressed third element, the third element is address information of a forwarding node, and an address compression manner used for the third element is different from that used for each of the first element and the second element; the address information set further includes the third element, the third element does not belong to the first subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

According to the packet transmission method provided in this possible design, different address compression manners can be used to compress elements that have different compression characteristics, so as to compress a length of each element to a greater extent, and compress more elements to a greater extent. In this way, when indicating compressed elements by using the first indication field of the packet, the compression node can indicate more elements by using the first indication field, with a given length of the first indication field. This can increase a quantity of forwarding nodes that can be specified, thereby reducing difficulty in network deployment.

In a possible design, the address information of the forwarding nodes on the packet forwarding path is an address information set, address information of each forwarding node is one element, the address information set includes a second subset and at least one first subset, the second subset includes at least one element, each first subset includes at least two elements, the element included in the second subset is different from the elements included in the at least one first subset, a common prefix shared by the elements in each first subset is a prefix of the first subset, and a prefix and prefix length of each element in the second subset are the same as those of address information of a source node or address information of a destination node; and that different address compression manners are used for the first element and the second element includes: the first element belongs to a first subset, and the second element belongs to the second subset; an address compression manner used for the first element is: eliminating, from the first element, a portion that is the same as a prefix of the first subset to which the first element belongs, to obtain the compressed first element; and an address compression manner used for the second element is: eliminating, from the second element, a portion that is the same as the prefix of the address information of the source node, to obtain the compressed second element; or eliminating, from the second element, a portion that is the same as the prefix of the address information of the destination node, to obtain the compressed second element.

According to the packet transmission method provided in this possible design, different address compression manners can be used to compress elements that have different compression characteristics, so as to compress a length of each element to a greater extent, and compress more elements to a greater extent. In this way, when indicating compressed elements by using the first indication field of the packet, the compression node can indicate more elements by using the first indication field, with a given length of the first indication field. This can increase a quantity of forwarding nodes that can be specified, thereby reducing difficulty in network deployment.

In a possible design, the first indication field is further used to indicate a compressed third element, the third element is address information of a forwarding node, and an address compression manner used for the third element is different from that used for each of the first element and the second element; the address information set further includes the third element, the third element does not belong to the first subset or the second subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

According to the packet transmission method provided in this possible design, different address compression manners can be used to compress elements that have different compression characteristics, so as to compress a length of each element to a greater extent, and compress more elements to a greater extent. In this way, when indicating compressed elements by using the first indication field of the packet, the compression node can indicate more elements by using the first indication field, with a given length of the first indication field. This can increase a quantity of forwarding nodes that can be specified, thereby reducing difficulty in network deployment.

In a possible design, the address information of the forwarding nodes on the packet forwarding path is an address information set, address information of each forwarding node is one element, the address information set includes at least one first subset and the second element, each first subset includes at least two elements, a common prefix shared by the elements in the first subset is a prefix of the first subset, and the second element shares a common portion with a media access control MAC address of a forwarding node corresponding to each second element; and that different address compression manners are used for the first element and the second element includes: the first element belongs to a first subset; an address compression manner used for the first element is: eliminating, from the first element, a portion that is the same as a prefix of the first subset to which the first element belongs, to obtain the compressed first element; and an address compression manner used for the second element is: eliminating, from the second element, the common portion shared with the MAC address of the forwarding node corresponding to the second element, to obtain the compressed second element.

According to the packet transmission method provided in this possible design, different address compression manners can be used to compress elements that have different compression characteristics, so as to compress a length of each element to a greater extent, and compress more elements to a greater extent. In this way, when indicating compressed elements by using the first indication field of the packet, the compression node can indicate more elements by using the first indication field, with a given length of the first indication field. This can increase a quantity of forwarding nodes that can be specified, thereby reducing difficulty in network deployment.

In a possible design, the address information of the forwarding nodes on the packet forwarding path is an address information set, address information of each forwarding node is one element, the address information set includes a second subset and the second element, the second subset includes at least one element, a prefix and prefix length of each element in the second subset are the same as those of address information of a source node or address information of a destination node, and the second element shares a common portion with a media access control MAC address of a forwarding node corresponding to each second element; and that different address compression manners are used for the first element and the second element includes: the first element belongs to the second subset; an address compression manner used for the first element is: eliminating, from the first element, a portion that is the same as the prefix of the address information of the source node, to obtain the compressed first element; or eliminating, from the first element, a portion that is the same as the prefix of the address information of the destination node, to obtain the compressed first element; and an address compression manner used for the second element is: eliminating, from the second element, the common portion shared with the MAC address of the forwarding node corresponding to the second element, to obtain the compressed second element.

According to the packet transmission method provided in this possible design, different address compression manners can be used to compress elements that have different compression characteristics, so as to compress a length of each element to a greater extent, and compress more elements to a greater extent. In this way, when indicating compressed elements by using the first indication field of the packet, the compression node can indicate more elements by using the first indication field, with a given length of the first indication field. This can increase a quantity of forwarding nodes that can be specified, thereby reducing difficulty in network deployment.

In a possible design, the first indication field is further used to indicate a fourth element, and the fourth element is uncompressed address information of a forwarding node on the packet forwarding path.

According to the packet transmission method provided in this possible design, when the IPv6 protocol is used for packet transmission, the IP source routing technology is used to guide the forwarding nodes on the packet forwarding path in packet forwarding, and there are forwarding node address information with no compression characteristic and forwarding node address information with a compression characteristic, the following manner may be selected: The forwarding node address information with a compression characteristic is compressed and the forwarding node address information with no compression characteristic is not compressed, so as to compress address information of more forwarding nodes to the maximum extent, so that lengths of compressed address information of the forwarding nodes are each less than 128 bits, and IP source routing is implemented by indicating the compressed address information by using the first indication field of the packet. In this way, when a length of the packet remains unchanged, a quantity of indicated elements can be increased. This can increase a quantity of forwarding nodes that can be specified, thereby reducing difficulty in network deployment.

In a possible design, the packet further includes a second indication field, and the second indication field is used to indicate address compression manners used for the elements indicated by the first indication field.

According to the packet transmission method provided in this possible design, a forwarding node receiving the packet can learn of, from the second indication field, an address compression manner used for address information (that is, an element) of a next forwarding node, so that the forwarding node receiving the packet can restore the complete address information of the next forwarding node based on the address compression manner used for the address information (that is, the element) of the next forwarding node and compressed address information (that is, a compressed element), of the next forwarding node, indicated by the first indication field. In this way, the forwarding node receiving the packet can forward the packet to the next forwarding node based on the address information of the next forwarding node, to implement IP source routing.

In a possible design, the second indication field includes at least one first field, each first field corresponds to one address compression manner, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

According to the packet transmission method provided in this possible design, an address compression manner used for each element indicated by the first indication field can be indicated by setting a first field corresponding to each address compression manner, so that the forwarding node receiving the packet can learn of, from the second indication field, the address compression manner used for the address information (that is, the element) of the next forwarding node, and the forwarding node receiving the packet can restore the complete address information of the next forwarding node based on the address compression manner used for the address information (that is, the element) of the next forwarding node and the compressed address information (that is, the compressed element), of the next forwarding node, indicated by the first indication field. In this way, the forwarding node receiving the packet can forward the packet to the next forwarding node based on the address information of the next forwarding node, to implement IP source routing.

In a possible design, the second indication field includes a second field and N first fields, where N is an integer greater than or equal to 1; the second field is used to indicate that a total of N address compression manners are used for the elements indicated by the first indication field; and each first field corresponds to one of the N address compression manners, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

According to the packet transmission method provided in this possible design, an address compression manner used for each element indicated by the first indication field is indicated by setting the second field indicating that a total of N address compression manners are used for the elements indicated by the first indication field, and a first field corresponding to each of the N address compression manners. This can reduce a length of the second indication field and reduce bit overheads.

In a possible design, the packet includes a second indication field corresponding to each element indicated by the first indication field, and the second indication field is used to indicate an address compression manner used for the corresponding element.

According to the packet transmission method provided in this possible design, an address compression manner used for an element is indicated by setting a second indication field corresponding to the element, so that a forwarding node receiving the packet can learn of, from a second indication field corresponding to address information of a next forwarding node, an address compression manner used for the address information (that is, an element) of the next forwarding node. Then, the forwarding node receiving the packet can restore the complete address information of the next forwarding node based on the address compression manner used for the address information (that is, the element) of the next forwarding node and compressed address information (that is, a compressed element), of the next forwarding node, indicated by the first indication field. In this way, the forwarding node receiving the packet can forward the packet to the next forwarding node based on the address information of the next forwarding node, to implement IP source routing.

In a possible design, the packet further includes a third indication field, and the third indication field is used to indicate prefix information of each first subset.

According to the packet transmission method provided in this possible design, by using the third indication field indicating the prefix information of each first subset, the forwarding node receiving the packet can restore the address information of the next forwarding node by adding, based on the address compression manner used for the address information (that is, the element) of the next forwarding node, prefix information that is indicated by the third indication field and that is of a first subset to which the address information of the next forwarding node belongs, to the front of the compressed address information (that is, the compressed element), of the next forwarding node, indicated by the first indication field, so that the forwarding node can forward the packet based on the address information of the next forwarding node, to implement IP source routing.

In a possible design, the third indication field includes at least one third field, each third field corresponds to a prefix of one first subset, and each third field includes a first portion and a second portion, where the first portion of the third field is used to indicate a length of the prefix of the corresponding first subset, and the second portion of the third field is used to indicate the prefix of the corresponding first subset.

According to the packet transmission method provided in this possible design, the first portion of the third field indicates the length of the prefix of the first subset, so as to improve efficiency of parsing out the prefix of the first subset by the forwarding node receiving the packet.

In a possible design, the first indication field includes at least one fourth field, and each fourth field corresponds to one element indicated by the first indication field; and when the element corresponding to the fourth field belongs to the first subset, the fourth field includes a first portion, a second portion, and a third portion, where the first portion of the fourth field is used to indicate a third field corresponding to a prefix of the first subset to which the element belongs, the second portion of the fourth field is used to indicate a length of a compressed element, and the third portion of the fourth field is used to indicate the compressed element; or when the element corresponding to the fourth field belongs to the second subset, the fourth field includes a first portion, a second portion, and a third portion, where the first portion of the fourth field is used to indicate an identifier of the address information of the source node whose prefix is the same as that of the second element or an identifier of the address information of the destination node whose prefix is the same as that of the second element, the second portion of the fourth field is used to indicate a length of a compressed element, and the third portion of the fourth field is used to indicate the compressed element; or when the element corresponding to the fourth field shares a common portion with a media access control MAC address of a forwarding node corresponding to the element, the fourth field includes a first portion and a second portion, where the first portion of the fourth field is used to indicate a length of a compressed element, and the second portion of the fourth field is used to indicate the compressed element.

According to the packet transmission method provided in this possible design, the fourth field indicates a corresponding element indicated by the first indication field, so as to improve efficiency of parsing out the address information of the next forwarding node by the forwarding node receiving the packet.

In a possible design, the packet further includes a fourth indication field; and the fourth indication field is used to indicate a start position of the third indication field in the packet.

According to the packet transmission method provided in this possible design, when the forwarding node receiving the packet needs to use prefix information of a first subset to restore the address information of the next forwarding node, the forwarding node receiving the packet can quickly extract the required prefix information of the first subset from the third indication field based on the fourth indication field, thereby improving efficiency of parsing out the address information of the next forwarding node from the packet by the forwarding node receiving the packet.

In a possible design, the packet further includes a fifth indication field; and the fifth indication field is used to indicate a start position of a next element in the first indication field, where a node corresponding to the next element is a next node forwarding or receiving the packet on the packet forwarding path.

According to the packet transmission method provided in this possible design, the forwarding node receiving the packet can quickly extract, based on the fifth indication field, the address information of the next forwarding node or the compressed address information of the next forwarding node from the first indication field, thereby improving efficiency of parsing out the address information of the next forwarding node from the packet by the forwarding node receiving the packet.

In a possible design, the packet further includes a sixth indication field; and the sixth indication field is used to indicate a type of the packet, where the type of the packet is used to indicate that the elements indicated by the first indication field include a compressed element.

According to the packet transmission method provided in this possible design, the forwarding node receiving the packet can learn, from the sixth indication field, that the first indication field includes a compressed element, so that the forwarding node can parse the packet based on a parsing manner used for a case in which a compressed element exists, thereby improving packet parsing efficiency.

According to a second aspect, an embodiment of this application provides a packet transmission method. The method may be applied to a forwarding node receiving a packet on a packet forwarding path, or may be applied to a chip in such a forwarding node. The following describes the method by using an example in which the method is applied to a forwarding node. The method includes: receiving a packet, where the packet includes a first indication field, the first indication field is used to indicate a compressed first element and a compressed second element, the first element and the second element are address information of different forwarding nodes on a packet forwarding path, and different address compression manners are used for the first element and the second element; determining address information of a next forwarding node based on the first indication field; and sending the packet to the next forwarding node based on the address information of the next forwarding node.

In a possible design, address information of forwarding nodes on the packet forwarding path is an address information set, address information of each forwarding node is one element, the address information set includes at least two first subsets, each first subset includes at least two elements, and a common prefix shared by the elements in the first subset is a prefix of the first subset; and that different address compression manners are used for the first element and the second element includes: the first element and the second element belong to different first subsets, and a prefix of a first subset to which the first element belongs is different from a prefix of a first subset to which the second element belongs; an address compression manner used for the first element is: eliminating, from the first element, a portion that is the same as the prefix of the first subset to which the first element belongs, to obtain the compressed first element; and an address compression manner used for the second element is: eliminating, from the second element, a portion that is the same as the prefix of the first subset to which the second element belongs, to obtain the compressed second element.

In a possible design, the first indication field is further used to indicate a compressed third element, the third element is address information of a forwarding node, and an address compression manner used for the third element is different from that used for each of the first element and the second element; the address information set further includes a second subset, the second subset includes at least one element, the element included in the second subset is different from the elements included in the first subset, and a prefix of each element in the second subset is the same as that of address information of a source node or address information of a destination node; and that an address compression manner used for the third element is different from that used for each of the first element and the second element includes: the third element belongs to the second subset; and the address compression manner used for the third element is: eliminating, from the third element, a portion that is the same as the prefix of the address information of the source node, to obtain the compressed third element; or eliminating, from the third element, a portion that is the same as the prefix of the address information of the destination node, to obtain the compressed third element.

In a possible design, the first indication field is further used to indicate a compressed third element, the third element is address information of a forwarding node, and an address compression manner used for the third element is different from that used for each of the first element and the second element; the address information set further includes the third element, the third element does not belong to the first subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

In a possible design, address information of forwarding nodes on the packet forwarding path is an address information set, address information of each forwarding node is one element, the address information set includes a second subset and at least one first subset, the second subset includes at least one element, each first subset includes at least two elements, the element included in the second subset is different from the elements included in the at least one first subset, a common prefix shared by the elements in each first subset is a prefix of the first subset, and a prefix and prefix length of each element in the second subset are the same as those of address information of a source node or address information of a destination node; and that different address compression manners are used for the first element and the second element includes: the first element belongs to a first subset, and the second element belongs to the second subset; an address compression manner used for the first element is: eliminating, from the first element, a portion that is the same as a prefix of the first subset to which the first element belongs, to obtain the compressed first element; and an address compression manner used for the second element is: eliminating, from the second element, a portion that is the same as the prefix of the address information of the source node, to obtain the compressed second element; or eliminating, from the second element, a portion that is the same as the prefix of the address information of the destination node, to obtain the compressed second element.

In a possible design, the first indication field is further used to indicate a compressed third element, the third element is address information of a forwarding node, and an address compression manner used for the third element is different from that used for each of the first element and the second element; the address information set further includes the third element, the third element does not belong to the first subset or the second subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

In a possible design, address information of forwarding nodes on the packet forwarding path is an address information set, address information of each forwarding node is one element, the address information set includes at least one first subset and the second element, each first subset includes at least two elements, a common prefix shared by the elements in the first subset is a prefix of the first subset, and the second element shares a common portion with a media access control MAC address of a forwarding node corresponding to each second element; and that different address compression manners are used for the first element and the second element includes: the first element belongs to a first subset; an address compression manner used for the first element is: eliminating, from the first element, a portion that is the same as a prefix of the first subset to which the first element belongs, to obtain the compressed first element; and an address compression manner used for the second element is: eliminating, from the second element, the common portion shared with the MAC address of the forwarding node corresponding to the second element, to obtain the compressed second element.

In a possible design, address information of forwarding nodes on the packet forwarding path is an address information set, address information of each forwarding node is one element, the address information set includes a second subset and the second element, the second subset includes at least one element, a prefix and prefix length of each element in the second subset are the same as those of address information of a source node or address information of a destination node, and the second element shares a common portion with a media access control MAC address of a forwarding node corresponding to each second element; and that different address compression manners are used for the first element and the second element includes: the first element belongs to the second subset; an address compression manner used for the first element is: eliminating, from the first element, a portion that is the same as the prefix of the address information of the source node, to obtain the compressed first element; or eliminating, from the first element, a portion that is the same as the prefix of the address information of the destination node, to obtain the compressed first element; and an address compression manner used for the second element is: eliminating, from the second element, the common portion shared with the MAC address of the forwarding node corresponding to the second element, to obtain the compressed second element.

In a possible design, the first indication field is further used to indicate a fourth element, and the fourth element is uncompressed address information of a forwarding node on the packet forwarding path.

In a possible design, the packet further includes a second indication field, and the second indication field is used to indicate address compression manners used for the elements indicated by the first indication field.

In a possible design, the second indication field includes at least one first field, each first field corresponds to one address compression manner, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

In a possible design, the second indication field includes a second field and N first fields, where N is an integer greater than or equal to 1; the second field is used to indicate that a total of N address compression manners are used for the elements indicated by the first indication field; and each first field corresponds to one of the N address compression manners, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

In a possible design, the packet includes a second indication field corresponding to each element indicated by the first indication field, and the second indication field is used to indicate an address compression manner used for the corresponding element.

In a possible design, the packet further includes a third indication field, and the third indication field is used to indicate prefix information of each first subset.

In a possible design, the third indication field includes at least one third field, each third field corresponds to a prefix of one first subset, and each third field includes a first portion and a second portion, where the first portion of the third field is used to indicate a length of the prefix of the corresponding first subset, and the second portion of the third field is used to indicate the prefix of the corresponding first subset.

In a possible design, the first indication field includes at least one fourth field, and each fourth field corresponds to one element indicated by the first indication field; and when the element corresponding to the fourth field belongs to the first subset, the fourth field includes a first portion, a second portion, and a third portion, where the first portion of the fourth field is used to indicate a third field corresponding to a prefix of the first subset to which the element belongs, the second portion of the fourth field is used to indicate a length of a compressed element, and the third portion of the fourth field is used to indicate the compressed element; or when the element corresponding to the fourth field belongs to the second subset, the fourth field includes a first portion, a second portion, and a third portion, where the first portion of the fourth field is used to indicate an identifier of the address information of the source node whose prefix is the same as that of the second element or an identifier of the address information of the destination node whose prefix is the same as that of the second element, the second portion of the fourth field is used to indicate a length of a compressed element, and the third portion of the fourth field is used to indicate the compressed element; or when the element corresponding to the fourth field shares a common portion with a media access control MAC address of a forwarding node corresponding to the element, the fourth field includes a first portion and a second portion, where the first portion of the fourth field is used to indicate a length of a compressed element, and the second portion of the fourth field is used to indicate the compressed element.

In a possible design, the determining address information of a next forwarding node based on the first indication field includes: determining, based on the second indication field, an address compression manner used for the address information of the next forwarding node; and restoring the address information of the next forwarding node based on the address compression manner used for the address information of the next forwarding node and compressed address information, of the next forwarding node, indicated by the first indication field.

In a possible design, the restoring the address information of the next forwarding node based on the address compression manner used for the address information of the next forwarding node and compressed address information, of the next forwarding node, indicated by the first indication field includes: when the address information of the next forwarding node belongs to the first subset, adding, to the front of the compressed address information of the next forwarding node based on the address compression manner used for the address information of the next forwarding node, prefix information that is indicated by the third indication field and that is of the first subset to which the address information of the next forwarding node belongs, to restore the address information of the next forwarding node; or when the address information of the next forwarding node belongs to the second subset, adding, to the front of the compressed address information of the next forwarding node based on the address compression manner used for the address information of the next forwarding node, the common prefix shared by the address information of the next forwarding node and the address information of the source node or the address information of the destination node, to restore the address information of the next forwarding node; or when the address information of the next forwarding node shares a common portion with a media access control MAC address of the next forwarding node, adding, to the compressed address information of the next forwarding node based on the address compression manner used for the address information of the next forwarding node, the common portion shared by the media access control MAC address of the next forwarding node and the address information of the next forwarding node, to restore the address information of the next forwarding node.

In a possible design, the packet further includes a fourth indication field; and the fourth indication field is used to indicate a start position of the third indication field in the packet.

In a possible design, the packet further includes a fifth indication field; and the fifth indication field is used to indicate a start position of a next element in the first indication field, where a node corresponding to the next element is a next node forwarding or receiving the packet on the packet forwarding path.

In a possible design, the packet further includes a sixth indication field; and the sixth indication field is used to indicate a type of the packet, where the type of the packet is used to indicate that the elements indicated by the first indication field include a compressed element.

For beneficial effects of the packet transmission method provided in the second aspect and the possible designs of the second aspect, refer to the beneficial effects brought by the first aspect and the possible designs of the first aspect. Details are not described herein again.

According to a third aspect, an embodiment of this application provides a communications apparatus. The communications apparatus may be a compression node, or may be a chip applied to a compression node. The communications apparatus includes: a processing module, configured to generate a packet based on address information of forwarding nodes on a packet forwarding path, where the packet includes a first indication field, the first indication field is used to indicate a compressed first element and a compressed second element, the first element and the second element are address information of different forwarding nodes, and different address compression manners are used for the first element and the second element; and a sending module, configured to send the packet.

In a possible design, the address information of the forwarding nodes on the packet forwarding path is an address information set, address information of each forwarding node is one element, the address information set includes at least two first subsets, each first subset includes at least two elements, and a common prefix shared by the elements in the first subset is a prefix of the first subset; and that different address compression manners are used for the first element and the second element includes: the first element and the second element belong to different first subsets, and a prefix of a first subset to which the first element belongs is different from a prefix of a first subset to which the second element belongs; an address compression manner used for the first element is: eliminating, from the first element, a portion that is the same as the prefix of the first subset to which the first element belongs, to obtain the compressed first element; and an address compression manner used for the second element is: eliminating, from the second element, a portion that is the same as the prefix of the first subset to which the second element belongs, to obtain the compressed second element.

In a possible design, the first indication field is further used to indicate a compressed third element, the third element is address information of a forwarding node, and an address compression manner used for the third element is different from that used for each of the first element and the second element; the address information set further includes a second subset, the second subset includes at least one element, the element included in the second subset is different from the elements included in the first subset, and a prefix of each element in the second subset is the same as that of address information of a source node or address information of a destination node; and that an address compression manner used for the third element is different from that used for each of the first element and the second element includes: the third element belongs to the second subset; and the address compression manner used for the third element is: eliminating, from the third element, a portion that is the same as the prefix of the address information of the source node, to obtain the compressed third element; or eliminating, from the third element, a portion that is the same as the prefix of the address information of the destination node, to obtain the compressed third element.

In a possible design, the first indication field is further used to indicate a compressed third element, the third element is address information of a forwarding node, and an address compression manner used for the third element is different from that used for each of the first element and the second element; the address information set further includes the third element, the third element does not belong to the first subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

In a possible design, the address information of the forwarding nodes on the packet forwarding path is an address information set, address information of each forwarding node is one element, the address information set includes a second subset and at least one first subset, the second subset includes at least one element, each first subset includes at least two elements, the element included in the second subset is different from the elements included in the at least one first subset, a common prefix shared by the elements in each first subset is a prefix of the first subset, and a prefix and prefix length of each element in the second subset are the same as those of address information of a source node or address information of a destination node; and that different address compression manners are used for the first element and the second element includes: the first element belongs to a first subset, and the second element belongs to the second subset; an address compression manner used for the first element is: eliminating, from the first element, a portion that is the same as a prefix of the first subset to which the first element belongs, to obtain the compressed first element; and an address compression manner used for the second element is: eliminating, from the second element, a portion that is the same as the prefix of the address information of the source node, to obtain the compressed second element; or eliminating, from the second element, a portion that is the same as the prefix of the address information of the destination node, to obtain the compressed second element.

In a possible design, the first indication field is further used to indicate a compressed third element, the third element is address information of a forwarding node, and an address compression manner used for the third element is different from that used for each of the first element and the second element; the address information set further includes the third element, the third element does not belong to the first subset or the second subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

In a possible design, the address information of the forwarding nodes on the packet forwarding path is an address information set, address information of each forwarding node is one element, the address information set includes at least one first subset and the second element, each first subset includes at least two elements, a common prefix shared by the elements in the first subset is a prefix of the first subset, and the second element shares a common portion with a media access control MAC address of a forwarding node corresponding to each second element; and that different address compression manners are used for the first element and the second element includes: the first element belongs to a first subset; an address compression manner used for the first element is: eliminating, from the first element, a portion that is the same as a prefix of the first subset to which the first element belongs, to obtain the compressed first element; and an address compression manner used for the second element is: eliminating, from the second element, the common portion shared with the MAC address of the forwarding node corresponding to the second element, to obtain the compressed second element.

In a possible design, the address information of the forwarding nodes on the packet forwarding path is an address information set, address information of each forwarding node is one element, the address information set includes a second subset and the second element, the second subset includes at least one element, a prefix and prefix length of each element in the second subset are the same as those of address information of a source node or address information of a destination node, and the second element shares a common portion with a media access control MAC address of a forwarding node corresponding to each second element; and that different address compression manners are used for the first element and the second element includes: the first element belongs to the second subset; an address compression manner used for the first element is: eliminating, from the first element, a portion that is the same as the prefix of the address information of the source node, to obtain the compressed first element; or eliminating, from the first element, a portion that is the same as the prefix of the address information of the destination node, to obtain the compressed first element; and an address compression manner used for the second element is: eliminating, from the second element, the common portion shared with the MAC address of the forwarding node corresponding to the second element, to obtain the compressed second element.

In a possible design, the first indication field is further used to indicate a fourth element, and the fourth element is uncompressed address information of a forwarding node on the packet forwarding path.

In a possible design, the packet further includes a second indication field, and the second indication field is used to indicate address compression manners used for the elements indicated by the first indication field.

In a possible design, the second indication field includes at least one first field, each first field corresponds to one address compression manner, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

In a possible design, the second indication field includes a second field and N first fields, where N is an integer greater than or equal to 1; the second field is used to indicate that a total of N address compression manners are used for the elements indicated by the first indication field; and each first field corresponds to one of the N address compression manners, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

In a possible design, the packet includes a second indication field corresponding to each element indicated by the first indication field, and the second indication field is used to indicate an address compression manner used for the corresponding element.

In a possible design, the packet further includes a third indication field, and the third indication field is used to indicate prefix information of each first subset.

In a possible design, the third indication field includes at least one third field, each third field corresponds to a prefix of one first subset, and each third field includes a first portion and a second portion, where the first portion of the third field is used to indicate a length of the prefix of the corresponding first subset, and the second portion of the third field is used to indicate the prefix of the corresponding first subset.

In a possible design, the first indication field includes at least one fourth field, and each fourth field corresponds to one element indicated by the first indication field; and when the element corresponding to the fourth field belongs to the first subset, the fourth field includes a first portion, a second portion, and a third portion, where the first portion of the fourth field is used to indicate a third field corresponding to a prefix of the first subset to which the element belongs, the second portion of the fourth field is used to indicate a length of a compressed element, and the third portion of the fourth field is used to indicate the compressed element; or when the element corresponding to the fourth field belongs to the second subset, the fourth field includes a first portion, a second portion, and a third portion, where the first portion of the fourth field is used to indicate an identifier of the address information of the source node whose prefix is the same as that of the second element or an identifier of the address information of the destination node whose prefix is the same as that of the second element, the second portion of the fourth field is used to indicate a length of a compressed element, and the third portion of the fourth field is used to indicate the compressed element; or when the element corresponding to the fourth field shares a common portion with a media access control MAC address of a forwarding node corresponding to the element, the fourth field includes a first portion and a second portion, where the first portion of the fourth field is used to indicate a length of a compressed element, and the second portion of the fourth field is used to indicate the compressed element.

In a possible design, the packet further includes a fourth indication field; and the fourth indication field is used to indicate a start position of the third indication field in the packet.

In a possible design, the packet further includes a fifth indication field; and the fifth indication field is used to indicate a start position of a next element in the first indication field, where a node corresponding to the next element is a next node forwarding or receiving the packet on the packet forwarding path.

In a possible design, the packet further includes a sixth indication field; and the sixth indication field is used to indicate a type of the packet, where the type of the packet is used to indicate that the elements indicated by the first indication field include a compressed element.

For beneficial effects of the communications apparatus provided in the third aspect and the possible designs of the third aspect, refer to the beneficial effects brought by the first aspect and the possible designs of the first aspect. Details are not described herein again.

According to a fourth aspect, an embodiment of this application provides a communications apparatus. The communications apparatus may be a forwarding node receiving a packet on a packet forwarding path, or may be a chip applied to such a forwarding node. The communications apparatus includes: a receiving module, configured to receive a packet, where the packet includes a first indication field, the first indication field is used to indicate a compressed first element and a compressed second element, the first element and the second element are address information of different forwarding nodes on a packet forwarding path, and different address compression manners are used for the first element and the second element; a processing module, configured to determine address information of a next forwarding node based on the first indication field; and a sending module, configured to send the packet to the next forwarding node based on the address information of the next forwarding node.

In a possible design, address information of forwarding nodes on the packet forwarding path is an address information set, address information of each forwarding node is one element, the address information set includes at least two first subsets, each first subset includes at least two elements, and a common prefix shared by the elements in the first subset is a prefix of the first subset; and that different address compression manners are used for the first element and the second element includes: the first element and the second element belong to different first subsets, and a prefix of a first subset to which the first element belongs is different from a prefix of a first subset to which the second element belongs; an address compression manner used for the first element is: eliminating, from the first element, a portion that is the same as the prefix of the first subset to which the first element belongs, to obtain the compressed first element; and an address compression manner used for the second element is: eliminating, from the second element, a portion that is the same as the prefix of the first subset to which the second element belongs, to obtain the compressed second element.

In a possible design, the first indication field is further used to indicate a compressed third element, the third element is address information of a forwarding node, and an address compression manner used for the third element is different from that used for each of the first element and the second element; the address information set further includes a second subset, the second subset includes at least one element, the element included in the second subset is different from the elements included in the first subset, and a prefix of each element in the second subset is the same as that of address information of a source node or address information of a destination node; and that an address compression manner used for the third element is different from that used for each of the first element and the second element includes: the third element belongs to the second subset; and the address compression manner used for the third element is: eliminating, from the third element, a portion that is the same as the prefix of the address information of the source node, to obtain the compressed third element; or eliminating, from the third element, a portion that is the same as the prefix of the address information of the destination node, to obtain the compressed third element.

In a possible design, the first indication field is further used to indicate a compressed third element, the third element is address information of a forwarding node, and an address compression manner used for the third element is different from that used for each of the first element and the second element; the address information set further includes the third element, the third element does not belong to the first subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

In a possible design, address information of forwarding nodes on the packet forwarding path is an address information set, address information of each forwarding node is one element, the address information set includes a second subset and at least one first subset, the second subset includes at least one element, each first subset includes at least two elements, the element included in the second subset is different from the elements included in the at least one first subset, a common prefix shared by the elements in each first subset is a prefix of the first subset, and a prefix and prefix length of each element in the second subset are the same as those of address information of a source node or address information of a destination node; and that different address compression manners are used for the first element and the second element includes: the first element belongs to a first subset, and the second element belongs to the second subset; an address compression manner used for the first element is: eliminating, from the first element, a portion that is the same as a prefix of the first subset to which the first element belongs, to obtain the compressed first element; and an address compression manner used for the second element is: eliminating, from the second element, a portion that is the same as the prefix of the address information of the source node, to obtain the compressed second element; or eliminating, from the second element, a portion that is the same as the prefix of the address information of the destination node, to obtain the compressed second element.

In a possible design, the first indication field is further used to indicate a compressed third element, the third element is address information of a forwarding node, and an address compression manner used for the third element is different from that used for each of the first element and the second element; the address information set further includes the third element, the third element does not belong to the first subset or the second subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

In a possible design, address information of forwarding nodes on the packet forwarding path is an address information set, address information of each forwarding node is one element, the address information set includes at least one first subset and the second element, each first subset includes at least two elements, a common prefix shared by the elements in the first subset is a prefix of the first subset, and the second element shares a common portion with a media access control MAC address of a forwarding node corresponding to each second element; and that different address compression manners are used for the first element and the second element includes: the first element belongs to a first subset; an address compression manner used for the first element is: eliminating, from the first element, a portion that is the same as a prefix of the first subset to which the first element belongs, to obtain the compressed first element; and an address compression manner used for the second element is: eliminating, from the second element, the common portion shared with the MAC address of the forwarding node corresponding to the second element, to obtain the compressed second element.

In a possible design, address information of forwarding nodes on the packet forwarding path is an address information set, address information of each forwarding node is one element, the address information set includes a second subset and the second element, the second subset includes at least one element, a prefix and prefix length of each element in the second subset are the same as those of address information of a source node or address information of a destination node, and the second element shares a common portion with a media access control MAC address of a forwarding node corresponding to each second element; and that different address compression manners are used for the first element and the second element includes: the first element belongs to the second subset; an address compression manner used for the first element is: eliminating, from the first element, a portion that is the same as the prefix of the address information of the source node, to obtain the compressed first element; or eliminating, from the first element, a portion that is the same as the prefix of the address information of the destination node, to obtain the compressed first element; and an address compression manner used for the second element is: eliminating, from the second element, the common portion shared with the MAC address of the forwarding node corresponding to the second element, to obtain the compressed second element.

In a possible design, the first indication field is further used to indicate a fourth element, and the fourth element is uncompressed address information of a forwarding node on the packet forwarding path.

In a possible design, the packet further includes a second indication field, and the second indication field is used to indicate address compression manners used for the elements indicated by the first indication field.

In a possible design, the second indication field includes at least one first field, each first field corresponds to one address compression manner, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

In a possible design, the second indication field includes a second field and N first fields, where N is an integer greater than or equal to 1; the second field is used to indicate that a total of N address compression manners are used for the elements indicated by the first indication field; and each first field corresponds to one of the N address compression manners, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

In a possible design, the packet includes a second indication field corresponding to each element indicated by the first indication field, and the second indication field is used to indicate an address compression manner used for the corresponding element.

In a possible design, the packet further includes a third indication field, and the third indication field is used to indicate prefix information of each first subset.

In a possible design, the third indication field includes at least one third field, each third field corresponds to a prefix of one first subset, and each third field includes a first portion and a second portion, where the first portion of the third field is used to indicate a length of the prefix of the corresponding first subset, and the second portion of the third field is used to indicate the prefix of the corresponding first subset.

In a possible design, the first indication field includes at least one fourth field, and each fourth field corresponds to one element indicated by the first indication field; and when the element corresponding to the fourth field belongs to the first subset, the fourth field includes a first portion, a second portion, and a third portion, where the first portion of the fourth field is used to indicate a third field corresponding to a prefix of the first subset to which the element belongs, the second portion of the fourth field is used to indicate a length of a compressed element, and the third portion of the fourth field is used to indicate the compressed element; or when the element corresponding to the fourth field belongs to the second subset, the fourth field includes a first portion, a second portion, and a third portion, where the first portion of the fourth field is used to indicate an identifier of the address information of the source node whose prefix is the same as that of the second element or an identifier of the address information of the destination node whose prefix is the same as that of the second element, the second portion of the fourth field is used to indicate a length of a compressed element, and the third portion of the fourth field is used to indicate the compressed element; or when the element corresponding to the fourth field shares a common portion with a media access control MAC address of a forwarding node corresponding to the element, the fourth field includes a first portion and a second portion, where the first portion of the fourth field is used to indicate a length of a compressed element, and the second portion of the fourth field is used to indicate the compressed element.

In a possible design, the processing module is specifically configured to: determine, based on the second indication field, an address compression manner used for the address information of the next forwarding node; and restore the address information of the next forwarding node based on the address compression manner used for the address information of the next forwarding node and compressed address information, of the next forwarding node, indicated by the first indication field.

In a possible design, the processing module is specifically configured to: when the address information of the next forwarding node belongs to the first subset, add, to the front of the compressed address information of the next forwarding node based on the address compression manner used for the address information of the next forwarding node, prefix information that is indicated by the third indication field and that is of the first subset to which the address information of the next forwarding node belongs, to restore the address information of the next forwarding node; or when the address information of the next forwarding node belongs to the second subset, add, to the front of the compressed address information of the next forwarding node based on the address compression manner used for the address information of the next forwarding node, the common prefix shared by the address information of the next forwarding node and the address information of the source node or the address information of the destination node, to restore the address information of the next forwarding node; or when the address information of the next forwarding node shares a common portion with a media access control MAC address of the next forwarding node, add, to the compressed address information of the next forwarding node based on the address compression manner used for the address information of the next forwarding node, the common portion shared by the media access control MAC address of the next forwarding node and the address information of the next forwarding node, to restore the address information of the next forwarding node.

In a possible design, the packet further includes a fourth indication field; and the fourth indication field is used to indicate a start position of the third indication field in the packet.

In a possible design, the packet further includes a fifth indication field; and the fifth indication field is used to indicate a start position of a next element in the first indication field, where a node corresponding to the next element is a next node forwarding or receiving the packet on the packet forwarding path.

In a possible design, the packet further includes a sixth indication field; and the sixth indication field is used to indicate a type of the packet, where the type of the packet is used to indicate that the elements indicated by the first indication field include a compressed element.

For beneficial effects of the communications apparatus provided in the fourth aspect and the possible designs of the fourth aspect, refer to the beneficial effects brought by the first aspect and the possible designs of the first aspect. Details are not described herein again.

According to a fifth aspect, an embodiment of this application provides a communications apparatus. The communications apparatus includes a processor, a memory, and a transmitter. The transmitter is coupled to the processor, and the processor controls a sending action of the transmitter.

The memory is configured to store computer executable program code, where the program code includes an instruction. When the processor executes the instruction, the instruction enables the communications apparatus to perform the packet transmission method provided in the first aspect or the possible designs of the first aspect.

According to a sixth aspect, an embodiment of this application provides a communications apparatus. The communications apparatus includes a processor, a memory, a receiver, and a transmitter. The receiver and the transmitter are both coupled to the processor. The processor controls a receiving action of the receiver, and the processor controls a sending action of the transmitter.

The memory is configured to store computer executable program code, where the program code includes an instruction. When the processor executes the instruction, the instruction enables the communications apparatus to perform the packet transmission method provided in the second aspect or the possible designs of the second aspect.

According to a seventh aspect, an embodiment of this application provides a communications apparatus, including a unit, module, or circuit configured to perform the method provided in the first aspect or the possible designs of the first aspect. The communications apparatus may be a compression node, or may be a module applied to a compression node, for example, may be a chip applied to a compression node.

According to an eighth aspect, an embodiment of this application provides a communications apparatus, including a unit, module, or circuit configured to perform the method provided in the second aspect or the possible designs of the second aspect. The communications apparatus may be a forwarding node receiving a packet on a packet forwarding path, or may be a module applied to such a forwarding node, for example, may be a chip applied to such a forwarding node.

According to a ninth aspect, an embodiment of this application provides a computer program product including an instruction. When the computer program product is run on a computer, the computer is enabled to perform the method in the first aspect or the possible designs of the first aspect.

According to a tenth aspect, an embodiment of this application provides a computer program product including an instruction. When the computer program product is run on a computer, the computer is enabled to perform the method in the second aspect or the possible designs of the second aspect.

According to an eleventh aspect, an embodiment of this application provides a computer-readable storage medium. The computer-readable storage medium stores an instruction, and when the instruction is run on a computer, the computer is enabled to perform the method in the first aspect or the possible designs of the first aspect.

According to a twelfth aspect, an embodiment of this application provides a computer-readable storage medium. The computer-readable storage medium stores an instruction, and when the instruction is run on a computer, the computer is enabled to perform the method in the second aspect or the possible designs of the second aspect.

According to a thirteenth aspect, an embodiment of this application provides a communications system. The communications system includes the communications apparatus in the third aspect or the possible designs of the third aspect, and the communications apparatus in the fourth aspect or the possible designs of the fourth aspect.

According to the packet transmission method and the communications apparatus and system provided in the embodiments of this application, when the IPv6 protocol is used for packet transmission, and the IP source routing technology is used to guide the forwarding nodes on the packet forwarding path in packet forwarding, different address compression manners may be used to compress address information of forwarding nodes that has different compression characteristics, so as to compress address information of more forwarding nodes to the maximum extent, so that lengths of compressed address information of the forwarding nodes are each less than 128 bits, and IP source routing is implemented by indicating the compressed address information by using the first indication field of the packet. In this way, when a length of the packet remains unchanged, a quantity of indicated elements can be increased. This can increase a quantity of forwarding nodes that can be specified, thereby reducing difficulty in network deployment.

BRIEF DESCRIPTION OF THE DRAWINGS

FIG. 2 is a schematic diagram of an existing extension header of a packet;

FIG. 3 is a schematic flowchart of a packet transmission method according to an embodiment of this application;

FIG. 4 shows a header format according to an embodiment of this application;

FIG. 5 shows another header format according to an embodiment of this application;

FIG. 6 shows still another header format according to an embodiment of this application;

FIG. 8 is a schematic diagram of still another header according to an embodiment of this application;

FIG. 9 is a schematic diagram of another packet transmission scenario according to an embodiment of this application;

FIG. 10 is a schematic diagram of still another header according to an embodiment of this application;

DETAILED DESCRIPTION OF ILLUSTRATIVE EMBODIMENTS

Figure 1:
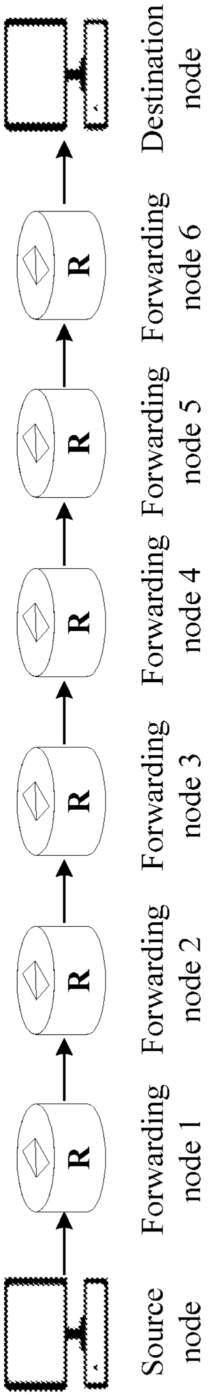
FIG. 1 is a diagram of an application scenario according to an embodiment of this application.

FIG. 1 is a diagram of an application scenario according to an embodiment of this application. As shown in FIG. 1, this embodiment of this application may be applied to a scenario including a source node, a destination node, and at least one forwarding node (such as a forwarding node 1 to a forwarding node 6 in FIG. 1), for example, an IoT network scenario, a closed networking scenario, and a conventional IP network scenario. A network in which the source node, the at least one forwarding node, and the destination node are located may be a wired network or a wireless network. In the application scenario shown in FIG. 1, the source node may send a packet to the destination node through the at least one forwarding node. Therefore, the at least one forwarding node may be referred to as a forwarding node on a packet forwarding path. A specific quantity of forwarding nodes on the packet forwarding path is not limited in this embodiment of this application.

The source node and the destination node described above may be network server devices or may be terminal devices. The terminal device may also be referred to as a terminal terminal, user equipment (UE), a mobile station (MS), a mobile terminal (MT), or the like. The terminal device may be a mobile phone, a tablet computer (pad), a computer with a wireless sending and receiving function, a virtual reality (VR) terminal device, an augmented reality (AR) terminal device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, a handheld communications device, a handheld computing device, an IoT node (which may also be referred to as an IoT device, and these two names are not distinguished in embodiments of this application), or the like.

The forwarding node described above may be a forwarding device specially used for packet forwarding, such as a router, a gateway, or a switch. Alternatively, the forwarding node may be a data node having a forwarding function, such as an IoT node.

In the prior art, when the source node sends a packet to the destination node through the at least one forwarding node, an IP source routing technology may be used to guide the forwarding node on the packet forwarding path in packet forwarding. That is, the source node specifies the packet forwarding path by adding, to the packet, address information (an address list for short) of the forwarding node on the packet forwarding path. In this way, a forwarding node receiving the packet may forward the packet based on the address list carried in the packet.

The following describes how the source node adds the address list to the packet in the prior art, by using an example in which the IPv6 protocol is used for packet transmission.

Specifically, an address list field is set in the packet. The source node may specify the packet forwarding path by adding, to the address list field, the address information (that is, a 128-bit (bit) IPv6 address) of the forwarding node on the packet forwarding path. The address list field may be set in an extension header of the packet. FIG. 2 is a schematic diagram of an existing extension header of a packet. As shown in FIG. 2, the extension header may include the following fields:

1. a field used to indicate a type of a next header (such as a Next Header field);
2. a field used to indicate a length of a current header (such as a Hdr Ext Len field);
3. a field used to indicate a type of the current header (such as a Routing Type field), where a value of this field is 0 in this example;
4. a field used to indicate a quantity of remaining nodes on a packet forwarding path (such as a Segment left field);
5. a reserved field; and
6. an address list field used to indicate address information of a forwarding node on the packet forwarding path, where address information (that is, an IPv6 address) of one forwarding node may be referred to as one element of the address list field.

Address information of each forwarding node is relatively long (occupying 128 bits). Therefore, when the source node specifies a relatively large quantity of forwarding nodes, that is, when there are a relatively large quantity of elements in the address list field, the address list field is excessively long. As a result, the extension header is excessively long, and an available payload (that is, a field for transmitting data) space of the packet is reduced. This greatly limits a quantity of elements in the address list field. In addition, the IEEE 802.15.4 protocol limits a maximum frame length to 127 bytes. If an IoT network uses the IEEE 802.15.4 protocol at layer 2 for packet transmission, a packet size needs to be limited, to avoid packet fragmentation and an increase in a processing burden of a forwarding node that are caused when the packet exceeds the maximum frame length. This limits a quantity of elements in the address list field of the packet.

It can be learned from the foregoing descriptions that when the IPv6 protocol is used for packet transmission, relatively long address information (which occupies 128 bits) of each forwarding node greatly limits a quantity of elements in the address list field, that is, limits a quantity of forwarding nodes that can be specified by the source node. This brings some difficulty in network deployment.

In consideration of the foregoing problem, the embodiments of this application provide a packet transmission method. When the IPv6 protocol is used for packet transmission, and the IP source routing technology is used to guide a forwarding node on a packet forwarding path in packet forwarding, different address compression manners may be used to compress address information of forwarding nodes that has different compression characteristics, so as to compress address information of more forwarding nodes to the maximum extent, so that lengths of compressed address information of the forwarding nodes are each less than 128 bits, and IP source routing is implemented by adding the compressed address information to an address list field of a packet. In this way, when a length of the address list field of the packet remains unchanged, a quantity of elements in the address list field can be increased. This can increase a quantity of forwarding nodes that can be specified by a source node, thereby reducing difficulty in network deployment.

It can be understood that the method in the embodiments of this application may be applied to the application scenario shown in FIG. 1. An execution entity of the embodiments of this application may be a compression node, and the compression node may be a source node or a forwarding node on a packet forwarding path. When the compression node is a forwarding node on a packet forwarding path, the IP source routing technology may not be used to send the packet between nodes before the forwarding node. For example, the compression node is the forwarding node 3 shown in FIG. 1. In this case, the source node, the forwarding node 1, and the forwarding node 2 may not use the IP source routing technology to send the packet, but instead send the packet in a conventional manner of searching a routing table. For details, refer to the prior art. Details are not described herein.

The following describes in detail, with reference to the example of the application scenario shown in FIG. 1, technical solutions in this application by using some embodiments. The following several embodiments may be combined with each other, and a same or similar concept or process may not be described repeatedly in some embodiments.

FIG. 3 is a schematic flowchart of a packet transmission method according to an embodiment of this application. This embodiment relates to a process of compressing, by a compression node by using different address compression manners, address information of one or more forwarding nodes on a packet forwarding path. As shown in FIG. 3, the method includes the following steps.

S101: Generate a packet based on address information of forwarding nodes on a packet forwarding path, where the packet includes a first indication field, the first indication field is used to indicate a compressed first element and a compressed second element, a first element and a second element are address information of different forwarding nodes, and different address compression manners are used for the first element and the second element.

S102: Send the packet.

Specifically, the address information of the forwarding nodes on the packet forwarding path may be considered as an address information set, and address information of each forwarding node is one element in the address information set. It can be understood that when a compression node is a source node, the address information set may include address information of all forwarding nodes on the packet forwarding path; or when a compression node is a forwarding node on the packet forwarding path, the address information set may include address information of all forwarding nodes following the forwarding node.

When generating the packet based on the address information set, the compression node may first classify elements in the address information set based on compression characteristics of the elements. A compression characteristic of an element herein may be, for example, any one of the following: having a same prefix as that of another element, having a same prefix as that of address information of the source node, having a same prefix as that of address information of a destination node, sharing a common portion with a media access control (MAC) address of a forwarding node corresponding to the element, and the like.

The compression characteristics of having a same prefix as that of another element, having the same prefix as that of the address information of the source node, having the same prefix as that of the address information of the destination node, and sharing a common portion with a MAC address of a forwarding node corresponding to an element are used as examples in the following to describe how the compression node classifies the elements in the address information set based on the compression characteristics of the elements.

1. The compression node determines whether the address information set includes elements that have a same prefix. If there are such elements, the elements that have the same prefix are classified into one first subset. Each first subset includes at least two elements, and a common prefix shared by the elements in the first subset is a prefix of the first subset. A prefix of each first subset is different, for example, a prefix length is different, or a prefix length is the same but prefix content is different.

2. The compression node determines whether the address information set includes an element whose prefix is the same as that of the address information of the source node or the address information of the destination node. If there is such an element, the element is classified into a second subset. It can be understood that for an element that is in the second subset and whose prefix is the same as that of the address information of the source node, a length of a common prefix shared by each element and the address information of the source node may be the same or may be different. Correspondingly, for an element that is in the second subset and whose prefix is the same as that of the address information of the destination node, a length of a common prefix shared by each element and the address information of the destination node may be the same or may be different.

3. The compression node determines whether the address information set includes an element that shares a common portion with a MAC address of a forwarding node corresponding to the element. If there is such an element, the element is classified into a third subset. It can be understood that a length of a common portion shared by each element in the third subset and a MAC address of a forwarding node corresponding to the element may be the same or may be different.

It can be understood that when the address information set includes a plurality of subsets, elements included in the subsets are different. In other words, no intersection exists between the subsets.

After the compression node classifies the elements in the address information set based on the foregoing compression characteristics, the compression node may compress the elements included in the address information set and generate the packet, so as to indicate compressed elements by using the first indication field of the packet. Specifically, the following several scenarios may be included.

Scenario 1: The address information set includes at least two first subsets.

In this scenario, based on a compression characteristic of an element in each first subset (which is that elements in a same subset have a same prefix), the compression node can compress the element by eliminating, from the element, a portion that is the same as a prefix of the first subset to which the element belongs, to obtain a compressed element (a length of which is less than 128 bits). If the address information set includes an element that does not belong to the first subset, it indicates that the element cannot be compressed. In this case, the compression node may not compress the element. Then, the compression node can generate the packet based on the compressed elements and the uncompressed element, so as to indicate each compressed element and each uncompressed element by using the first indication field of the packet.

For example, the first element and the second element belong to different first subsets, and a fourth element does not belong to any first subset. An address compression manner used by the compression node for the first element may be: eliminating, from the first element, a portion that is the same as a prefix of a first subset to which the first element belongs, to obtain the compressed first element. An address compression manner used by the compression node for the second element may be: eliminating, from the second element, a portion that is the same as a prefix of a first subset to which the second element belongs, to obtain the compressed second element. The compression node may not compress the fourth element. In other words, for the first element and the second element that can be compressed and that have different compression characteristics, the compression node can perform compression by eliminating different prefixes (that is, in different address compression manners). Then, the compression node can generate the packet based on the compressed first element, the compressed second element, and the uncompressed fourth element, so as to indicate the compressed first element, the compressed second element, and the uncompressed fourth element by using the first indication field of the packet.

Scenario 2: The address information set includes the second subset and at least one first subset.

In this scenario, based on a compression characteristic of an element in each first subset (which is that elements in a same subset have a same prefix), the compression node can compress the element by eliminating, from the element, a portion that is the same as a prefix of the first subset to which the element belongs, to obtain a compressed element (a length of which is less than 128 bits). Based on a compression characteristic of an element in the second subset (which is that such an element has a same prefix as that of the address information of the source node or the address information of the destination node), the compression node can compress the element by eliminating, from the element, a portion that is the same as the prefix of the address information of the source node or the address information of the destination node, to obtain a compressed element (a length of which is less than 128 bits). If the address information set includes an element that does not belong to any of the foregoing subsets, it indicates that the element cannot be compressed. In this case, the compression node may not compress the element. Then, the compression node can generate the packet based on the compressed elements and the uncompressed element, so as to indicate each compressed element and each uncompressed element by using the first indication field of the packet.

For example, the first element belongs to a first subset, the second element belongs to the second subset, and a fourth element does not belong to any subset. An address compression manner used by the compression node for the first element may be: eliminating, from the first element, a portion that is the same as a prefix of the first subset to which the first element belongs, to obtain the compressed first element. An address compression manner used by the compression node for the second element may be: eliminating, from the second element, a portion that is the same as the prefix of the address information of the source node or the address information of the destination node, to obtain the compressed second element. The compression node may not compress the fourth element. In other words, for the first element and the second element that can be compressed and that have different compression characteristics, the compression node can perform compression by eliminating different prefixes (that is, in different address compression manners). Then, the compression node can generate the packet based on the compressed first element, the compressed second element, and the uncompressed fourth element, so as to indicate the compressed first element, the compressed second element, and the uncompressed fourth element by using the first indication field of the packet.

For example, the first element belongs to a first subset, the second element belongs to another first subset, a third element belongs to the second subset, and a fourth element does not belong to any subset. An address compression manner used by the compression node for the first element may be: eliminating, from the first element, a portion that is the same as a prefix of the first subset to which the first element belongs, to obtain the compressed first element. An address compression manner used by the compression node for the second element may be: eliminating, from the second element, a portion that is the same as a prefix of a first subset to which the second element belongs, to obtain the compressed second element. An address compression manner used by the compression node for the third element may be: eliminating, from the third element, a portion that is the same as the prefix of the address information of the source node or the address information of the destination node, to obtain a compressed third element. The compression node may not compress the fourth element. In other words, for the first element, the second element, and the third element that can be compressed and that have different compression characteristics, the compression node can perform compression by eliminating different prefixes (that is, in different address compression manners). Then, the compression node can generate the packet based on the compressed first element, the compressed second element, the compressed third element, and the uncompressed fourth element, so as to indicate the compressed first element, the compressed second element, the compressed third element, and the uncompressed fourth element by using the first indication field of the packet.

Scenario 3: The address information set includes the third subset and at least one first subset.

In this scenario, based on a compression characteristic of an element in each first subset (which is that elements in a same subset have a same prefix), the compression node can compress the element by eliminating, from the element, a portion that is the same as a prefix of the first subset to which the element belongs, to obtain a compressed element (a length of which is less than 128 bits). Based on a compression characteristic of an element in the third subset (which is that such an element shares a common portion with a MAC address of a forwarding node corresponding to the element), the compression node can compress the element by eliminating, from the element, the common portion shared with the MAC address of the forwarding node corresponding to the element, to obtain a compressed element (a length of which is less than 128 bits). If the address information set includes an element that does not belong to any of the foregoing subsets, it indicates that the element cannot be compressed. In this case, the compression node may not compress the element. Then, the compression node can generate the packet based on the compressed elements and the uncompressed element, so as to indicate each compressed element and each uncompressed element by using the first indication field of the packet.

For example, the first element belongs to a first subset, the second element belongs to the third subset, and a fourth element does not belong to any subset. An address compression manner used by the compression node for the first element may be: eliminating, from the first element, a portion that is the same as a prefix of the first subset to which the first element belongs, to obtain the compressed first element. An address compression manner used by the compression node for the second element may be: eliminating, from the second element, a common portion shared with a MAC address of a forwarding node corresponding to the second element, to obtain the compressed second element. The compression node may not compress the fourth element. In other words, for the first element and the second element that can be compressed and that have different compression characteristics, the compression node can perform compression by eliminating different prefixes (that is, in different address compression manners). Then, the compression node can generate the packet based on the compressed first element, the compressed second element, and the uncompressed fourth element, so as to indicate the compressed first element, the compressed second element, and the uncompressed fourth element by using the first indication field of the packet.

For example, the first element belongs to a first subset, the second element belongs to another first subset, a third element belongs to the third subset, and a fourth element does not belong to any subset. An address compression manner used by the compression node for the first element may be: eliminating, from the first element, a portion that is the same as a prefix of the first subset to which the first element belongs, to obtain the compressed first element. An address compression manner used by the compression node for the second element may be: eliminating, from the second element, a portion that is the same as a prefix of the first subset to which the second element belongs, to obtain the compressed second element. An address compression manner used by the compression node for the third element may be: eliminating, from the third element, a common portion shared with a MAC address of a forwarding node corresponding to the third element, to obtain a compressed third element. The compression node may not compress the fourth element. In other words, for the first element, the second element, and the third element that can be compressed and that have different compression characteristics, the compression node can perform compression by eliminating different prefixes (that is, in different address compression manners). Then, the compression node can generate the packet based on the compressed first element, the compressed second element, the compressed third element, and the uncompressed fourth element, so as to indicate the compressed first element, the compressed second element, the compressed third element, and the uncompressed fourth element by using the first indication field of the packet.

Scenario 4: The address information set includes the second subset and the third subset.

In this scenario, based on a compression characteristic of an element in the second subset (which is that such an element has a same prefix as that of the address information of the source node or the address information of the destination node), the compression node can compress the element by eliminating, from the element, a portion that is the same as the prefix of the address information of the source node or the address information of the destination node, to obtain a compressed element (a length of which is less than 128 bits). Based on a compression characteristic of an element in the third subset (which is that such an element shares a common portion with a MAC address of a forwarding node corresponding to the element), the compression node can compress the element by eliminating, from the element, the common portion shared with the MAC address of the forwarding node corresponding to the element, to obtain a compressed element (a length of which is less than 128 bits). If the address information set includes an element that does not belong to any of the foregoing subsets, it indicates that the element cannot be compressed. In this case, the compression node may not compress the element. Then, the compression node can generate the packet based on the compressed elements and the uncompressed element, so as to indicate each compressed element and each uncompressed element by using the first indication field of the packet.

For example, the first element belongs to the second subset, the second element belongs to the third subset, and a fourth element does not belong to any subset. An address compression manner used by the compression node for the first element may be: eliminating, from the first element, a portion that is the same as the prefix of the address information of the source node or the address information of the destination node, to obtain the compressed first element. An address compression manner used by the compression node for the second element may be: eliminating, from the second element, a common portion shared with a MAC address of a forwarding node corresponding to the second element, to obtain the compressed second element. The compression node may not compress the fourth element. In other words, for the first element and the second element that can be compressed and that have different compression characteristics, the compression node can perform compression by eliminating different prefixes (that is, in different address compression manners). Then, the compression node can generate the packet based on the compressed first element, the compressed second element, and the uncompressed fourth element, so as to indicate the compressed first element, the compressed second element, and the uncompressed fourth element by using the first indication field of the packet.

Scenario 5: The address information set includes the second subset, the third subset, and at least one first subset.

In this scenario, based on a compression characteristic of an element in each first subset (which is that elements in a same subset have a same prefix), the compression node can compress the element by eliminating, from the element, a portion that is the same as a prefix of the first subset to which the element belongs, to obtain a compressed element (a length of which is less than 128 bits).

Based on a compression characteristic of an element in the second subset (which is that such an element has a same prefix as that of the address information of the source node or the address information of the destination node), the compression node can compress the element by eliminating, from the element, a portion that is the same as the prefix of the address information of the source node or the address information of the destination node, to obtain the compressed element (a length of which is less than 128 bits).

Based on a compression characteristic of an element in the third subset (which is that such an element shares a common portion with a MAC address of a forwarding node corresponding to the element), the compression node can compress the element by eliminating, from the element, the common portion shared with the MAC address of the forwarding node corresponding to the element, to obtain a compressed element (a length of which is less than 128 bits).

If the address information set includes an element that does not belong to any of the foregoing subsets, it indicates that the element cannot be compressed. In this case, the compression node may not compress the element. Then, the compression node can generate the packet based on the compressed elements and the uncompressed element, so as to indicate each compressed element and each uncompressed element by using the first indication field of the packet.

The first element, the second element, a third element, and a fourth element are used as examples. When the first element belongs to a first subset, the second element belongs to the second subset, the third element belongs to the third subset, and the fourth element does not belong to any subset, an address compression manner used by the compression node for the first element may be: eliminating, from the first element, a portion that is the same as a prefix of the first subset to which the first element belongs, to obtain the compressed first element; an address compression manner used by the compression node for the second element may be: eliminating, from the second element, a portion that is the same as the prefix of the address information of the source node or the address information of the destination node, to obtain the compressed second element; an address compression manner used by the compression node for the third element may be: eliminating, from the third element, a common portion shared with a MAC address of a forwarding node corresponding to the third element, to obtain a compressed third element; and the compression node may not compress the fourth element. In other words, for the first element, the second element, and the third element that can be compressed and that have different compression characteristics, the compression node can perform compression by eliminating different prefixes (that is, in different address compression manners). Then, the compression node can generate the packet based on the compressed first element, the compressed second element, the compressed third element, and the uncompressed fourth element, so as to indicate the compressed first element, the compressed second element, the compressed third element, and the uncompressed fourth element by using the first indication field of the packet.

Scenario 6: The address information set includes the second subset.

In this scenario, based on a compression characteristic of an element in the second subset (which is that such an element has a same prefix as that of the address information of the source node or the address information of the destination node), the compression node can compress the element by eliminating, from the element, a portion that is the same as the prefix of the address information of the source node or the address information of the destination node, to obtain a compressed element (a length of which is less than 128 bits). If the address information set includes an element that does not belong to the second subset, it indicates that the element cannot be compressed. In this case, the compression node may not compress the element. Then, the compression node can generate the packet based on the compressed element and the uncompressed element, so as to indicate each compressed element and each uncompressed element by using the first indication field of the packet.

For example, the first element and the second element belong to the second subset, and a fourth element does not belong to the second subset, where the first element has a same prefix as that of the address information of the source node, and the second element has a same prefix as that of the address information of the destination node. An address compression manner used by the compression node for the first element may be: eliminating, from the first element, a portion that is the same as the prefix of the address information of the source node, to obtain the compressed first element. An address compression manner used by the compression node for the second element may be: eliminating, from the second element, a portion that is the same as the prefix of the address information of the destination node, to obtain the compressed second element. The compression node may not compress the fourth element. In other words, for the first element and the second element that can be compressed and that have different compression characteristics, the compression node can perform compression by eliminating different prefixes (that is, in different address compression manners). Then, the compression node can generate the packet based on the compressed first element, the compressed second element, and the uncompressed fourth element, so as to indicate the compressed first element, the compressed second element, and the uncompressed fourth element by using the first indication field of the packet.

Scenario 7: The address information set includes the third subset.

In this scenario, based on a compression characteristic of an element in the third subset (which is that such an element shares a common portion with a MAC address of a forwarding node corresponding to the element), the compression node can compress the element by eliminating, from the element, the common portion shared with the MAC address of the forwarding node corresponding to the element, to obtain a compressed element (a length of which is less than 128 bits). If the address information set includes an element that does not belong to the third subset, it indicates that the element cannot be compressed. In this case, the compression node may not compress the element. Then, the compression node can generate the packet based on the compressed element and the uncompressed element, so as to indicate each compressed element and each uncompressed element by using the first indication field of the packet.

For example, the first element and the second element belong to the third subset, and a fourth element does not belong to the third subset. An address compression manner used by the compression node for the first element may be: eliminating, from the first element, a common portion shared with a MAC address of a forwarding node corresponding to the first element, to obtain the compressed first element. An address compression manner used by the compression node for the second element may be: eliminating, from the second element, a common portion shared with a MAC address of a forwarding node corresponding to the second element, to obtain the compressed second element. The compression node may not compress the fourth element. In other words, for the first element and the second element that can be compressed and that have different compression characteristics, the compression node can perform compression by eliminating different prefixes (that is, in different address compression manners). Then, the compression node can generate the packet based on the compressed first element, the compressed second element, and the uncompressed fourth element, so as to indicate the compressed first element, the compressed second element, and the uncompressed fourth element by using the first indication field of the packet.

It can be learned from the foregoing enumerated scenarios that in this embodiment of this application, the compression node can compress, in different address compression manners, elements that have different compression characteristics, so as to compress a length of each element to a greater extent and compress more elements to a greater extent. In this way, when indicating compressed elements by using the first indication field of the packet, the compression node can indicate more elements by using the first indication field, with a given length of the first indication field. This can increase a quantity of forwarding nodes that can be specified by the source node, thereby reducing difficulty in network deployment.

It should be noted that the foregoing enumerated compression characteristics of elements, the classification manners of elements in the address information set, and the enumerated scenarios are merely examples. This is not limited in this embodiment of this application and may be specifically determined based on a compression characteristic of an element in the address information set.

Optionally, in some embodiments, there are further one or more non-IP-address-type forwarding nodes on the packet forwarding path. That is, the packet is sent to the forwarding node based on other identification information than address information of the forwarding node, such as label information or a device identification (identification, ID) number. For these forwarding nodes, the compression node can specify the packet forwarding path by indicating identifiers of the non-IP-address-type forwarding nodes by using the first indication field.

The scenario shown in FIG. 1 is still used as an example. It is assumed that the forwarding node 1, the forwarding node 2, the forwarding node 3, and the forwarding node 6 to a forwarding node 8 are nodes in a non-multiprotocol label switching (multi-protocol label switching, MPLS) domain, and all of these nodes are IP-address-type forwarding nodes. That is, the nodes communicate with each other by using address information of the nodes as identifiers. The forwarding node 4 and the forwarding node 5 are nodes in an MPLS domain, and these nodes communicate with each other by using MPLS labels of the nodes as identifiers.

For example, the compression node is the source node. The compression node can indicate address information of the forwarding node 1, the forwarding node 2, the forwarding node 3, and the forwarding node 6 to the forwarding node 8 by using the first indication field of the packet, and indicate label information of the forwarding node 4 and the forwarding node 5 by using the first indication field, to specify the packet forwarding path.

It can be learned from the foregoing enumerated scenarios that in this embodiment of this application, when there are a non-IP-address-type forwarding node and an IP-address-type forwarding node on the packet forwarding path, the compression node can compress, in different address compression manners, address information of IP-address-type forwarding nodes that has different compression characteristics, so as to compress a length of address information of each IP-address-type forwarding node to a greater extent, and compress address information of more IP-address-type forwarding nodes to a greater extent. In this way, with a given length of the first indication field, the compression node can indicate more elements by using the first indication field. This can increase a quantity of forwarding nodes that can be specified by the source node, thereby reducing difficulty in network deployment.

As described in the foregoing embodiment, the compression node can compress, in different address compression manners, elements that have different compression characteristics. Therefore, in an implementation of this embodiment of this application, the packet may further include a second indication field. The second indication field is used to indicate address compression manners used for the elements indicated by the first indication field.

An implementation used for the second indication field to indicate the address compression manners used for the elements indicated by the first indication field is not limited in this embodiment of this application. For example, the second indication field may include at least one first field, each first field corresponds to one address compression manner, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit. When the first value is 0, the second value may be 1; or when the first value is 1, the second value is 0.

Alternatively, the second indication field includes a second field and N first fields, where N is an integer greater than or equal to 1. The second field is used to indicate that a total of N address compression manners are used for the elements indicated by the first indication field. Each first field corresponds to one of the N address compression manners, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

Alternatively, the packet includes a second indication field corresponding to each element indicated by the first indication field, and the second indication field is used to indicate an address compression manner used for the corresponding element.

Therefore, a forwarding node receiving the packet can learn of, from the second indication field, an address compression manner used for address information (that is, an element) of a next forwarding node, so that the forwarding node receiving the packet can restore the complete address information of the next forwarding node based on the address compression manner used for the address information (that is, the element) of the next forwarding node and compressed address information (that is, a compressed element), of the next forwarding node, indicated by the first indication field. In this way, the forwarding node receiving the packet can forward the packet to the next forwarding node based on the address information of the next forwarding node.

For example, the address compression manner used for the address information (that is, the element) of the next forwarding node is eliminating, from the address information of the next forwarding node, a portion that is the same as the prefix of the address information of the source node or the address information of the destination node, to obtain the compressed address information (that is, the compressed element) of the next forwarding node. In this case, the forwarding node receiving the packet can extract the prefix from the address information of the source node or the address information of the destination node carried in the packet, and add the prefix to the front of the compressed address information, of the next forwarding node, indicated by the first indication field, to restore the address information of the next forwarding node.

For another example, the address compression manner used for the address information (that is, the element) of the next forwarding node is eliminating, from the address information of the next forwarding node, a common portion shared with a MAC address of the next forwarding node, to obtain the compressed address information (that is, the compressed element) of the next forwarding node. In this case, the forwarding node receiving the packet can use the MAC address of the next forwarding node to supplement, to 128 bits, the compressed address information, of the next forwarding node, indicated by the first indication field, to restore the address information of the next forwarding node.

Optionally, in some embodiments, when there are further one or more non-IP-address-type forwarding nodes on the packet forwarding path, the second indication field is further used to indicate whether an element indicated by the first indication field is an identifier of a non-IP-address-type forwarding node.

An implementation used for the second indication field to indicate whether an element indicated by the first indication field is an identifier of a non-IP-address-type forwarding node is not limited in this embodiment of this application. For example, a first field may be added to the second indication field. One bit in each first field corresponds to one element indicated by the first indication field, and when the bit is a first value, it indicates that the element corresponding to the bit is an identifier of a non-IP-address-type forwarding node, or when the bit is a second value, it indicates that the element corresponding to the bit is an identifier of an IP-address-type forwarding node. Alternatively, the packet includes a second indication field corresponding to each element indicated by the first indication field, and the second indication field is used to indicate an address compression manner used for the corresponding element, or is used to indicate whether the corresponding element is an identifier of a non-IP-address-type forwarding node.

Therefore, when the next forwarding node is a non-IP-address-type forwarding node, the forwarding node receiving the packet can learn, from the second indication field, that the next forwarding node is a non-IP-address-type forwarding node, so that the forwarding node receiving the packet can forward the packet to the next forwarding node based on an identifier, of the next forwarding node, indicated by the first indication field.

When the compressed element indicated by the first indication field is an element in a first subset, the packet may further include a third indication field, and the third indication field is used to indicate prefix information of each first subset. In this way, the forwarding node receiving the packet can restore the address information of the next forwarding node by adding, based on the address compression manner used for the address information (that is, the element) of the next forwarding node, prefix information that is indicated by the third indication field and that is of a first subset to which the address information of the next forwarding node belongs, to the front of the compressed address information (that is the compressed element), of the next forwarding node, indicated by the first indication field.

A manner in which the third indication field indicates prefix information of each first subset is not limited in this embodiment of this application. For example, the third indication field includes at least one third field, and each third field corresponds to a prefix of one first subset and is used to indicate the prefix of the corresponding first subset. In another implementation, each third field may include a first portion and a second portion, where the first portion of the third field is used to indicate a length of the prefix of the corresponding first subset, and the second portion of the third field is used to indicate the prefix of the corresponding first subset. Indicating a length of a prefix of a first subset by using the first portion can improve efficiency of parsing out the prefix of the first subset.

In this implementation, the first indication field may include at least one fourth field, and each fourth field corresponds to one element indicated by the first indication field; and when the element corresponding to the fourth field belongs to a first subset, the fourth field includes a first portion, a second portion, and a third portion, where the first portion of the fourth field is used to indicate a third field corresponding to a prefix of the first subset to which the element belongs, the second portion of the fourth field is used to indicate a length of a compressed element, and the third portion of the fourth field is used to indicate the compressed element; or when the element corresponding to the fourth field belongs to the second subset, the fourth field includes a first portion, a second portion, and a third portion, where the first portion of the fourth field is used to indicate an identifier of the address information of the source node whose prefix is the same as that of the second element or an identifier of the address information of the destination node whose prefix is the same as that of the second element, the second portion of the fourth field is used to indicate a length of a compressed element, and the third portion of the fourth field is used to indicate the compressed element; or when the element corresponding to the fourth field shares a common portion with a media access control MAC address of a forwarding node corresponding to the element, the fourth field includes a first portion and a second portion, where the first portion of the fourth field is used to indicate a length of a compressed element, and the second portion of the fourth field is used to indicate the compressed element; or when the element corresponding to the fourth field is an identifier of a non-IP-address-type forwarding node, the fourth field includes a first portion, a second portion, and a third portion, where the first portion of the fourth field is used to indicate a type (such as a label or an ID) of the element, the second portion of the fourth field is used to indicate a length of the element, and the third portion of the fourth field is used to indicate the element.

It can be understood that the fourth field may not include a portion used to indicate a length of a compressed element. This may be specifically determined based on a use requirement.

In another implementation, the packet may further include one or more of a fourth indication field, a fifth indication field, and a sixth indication field.

The fourth indication field is used to indicate a start position of the third indication field in the packet.

The fifth indication field is used to indicate a start position of a next element in the first indication field, where a node corresponding to the next element is a next node forwarding or receiving the packet on the packet forwarding path. The fourth indication field and/or the fifth indication field can improve efficiency of parsing out the address information of the next forwarding node from the packet by the forwarding node receiving the packet.

The sixth indication field is used to indicate a type of the packet, where the type of the packet is used to indicate that the elements indicated by the first indication field include a compressed element. The forwarding node receiving the packet can learn, from the sixth indication field, that the first indication field includes a compressed element, so that the forwarding node can parse the packet based on a parsing manner used for a case in which a compressed element exists, thereby improving packet parsing efficiency.

The foregoing indication fields may be located in a data field of the packet, or may be located in a header of the packet, or some of the indication fields may be located in a data field of the packet and some of the indication fields may be located in a header of the packet.

The following describes a header format by using an example in which the indication fields are located in an existing extension header, of the packet, used to implement IP source routing. Specifically, the following several formats may be included.

First format: FIG. 4 shows a header format according to an embodiment of this application. As shown in FIG. 4, the header may include the following fields:

1. a field used to indicate a type of a next header (such as a Next Header field);

2. a field used to indicate a length of a current header (such as a Hdr Ext Len field);

3. a field used to indicate a quantity of remaining nodes on the packet forwarding path (such as a Segment left field);

4. the second indication field used to indicate the address compression manners used for the elements indicated by the first indication field, where in this example, the second indication field includes the second field and N first fields; a value of N is specifically determined based on an address compression manner used for address information of a forwarding node on the packet forwarding path when the compression node sends the packet, for example, when the compression node uses the following compression manners: an address compression manner of compressing an element by eliminating, from the element, a portion that is the same as a prefix of a first subset to which the element belongs, and an address compression manner of compressing an element by eliminating, from the element, a portion that is the same as the prefix of the address information of the source node or the address information of the destination node, the second indication field may include two first fields, that is, N is equal to 2; and FIG. 4 is a schematic diagram in which N being equal to 2 is used as an example;

5. the third indication field used to indicate prefix information of each first subset; and 6. the first indication field used to indicate each compressed element and each uncompressed element, where address information (that is, an IPv6 address) of one forwarding node may be referred to as one element of an address list field.

Optionally, the header may further include at least one of the following fields:

7. the fourth indication field used to indicate the start position of the third indication field in the packet;

8. the fifth indication field used to indicate a start position of a next element in the first indication field; and 9. the sixth indication field used to indicate the type of the packet, where in this embodiment of this application, a value of this field is, for example, 100.

During specific implementation, the sixth indication field may be, for example, a Routing Type field of the original extension header. A reserved field of the original extension header may be split into one or more of the following several indication fields: the fourth indication field, the fifth indication field, and the second indication field. An address list field of the original extension header may be split into the following several portions: the third indication field, the first indication field, and the address information of the destination node. It can be understood that FIG. 4 is merely an example. A position of each indication field in the header and a length (that is, a quantity of occupied bits) of each indication field are not limited in this embodiment of this application.

Second format: FIG. 5 shows another header format according to an embodiment of this application. As shown in FIG. 5, the header differs from the header shown in FIG. 4 in that the header shown in FIG. 5 includes the second indication field corresponding to each element indicated by the first indication field. That is, a quantity of second indication fields included in the header is in one-to-one correspondence with a quantity of elements, so as to indicate address compression manners used for the corresponding elements. For other fields and/or indication fields included in the header, refer to the descriptions about FIG. 4. Details are not described herein again.

In this implementation, a reserved field of the original extension header may be split into one or more of the following indication fields: the fourth indication field and the fifth indication field. An address list field of the original extension header may be split into the following several portions: the third indication field, the second indication field, the first indication field, and the address information of the destination node. It can be understood that FIG. 5 is merely an example. A position of each indication field in the header and a length (that is, a quantity of occupied bits) of each indication field are not limited in this embodiment of this application.

Optionally, in an implementation, the second indication field may include the following fields: a field used to indicate an address compression manner, and at least one field used to indicate a function corresponding to an element (a specific function indicated by the field may be set based on an actual requirement).

Third format: FIG. 6 shows still another header format according to an embodiment of this application. As shown in FIG. 6, the header differs from the header shown in FIG. 4 in that the second indication field in the header shown in FIG. 6 may include at least one first field. A quantity of first fields is determined based on address compression manners that can be supported by the compression node. For example, the compression node supports an address compression manner of compressing an element by eliminating, from the element, a portion that is the same as a prefix of a first subset to which the element belongs; an address compression manner of compressing an element by eliminating, from the element, a portion that is the same as the prefix of the address information of the source node or the address information of the destination node; and an address compression manner of compressing an element by eliminating, from the element, a common portion shared with a MAC address of a forwarding node corresponding to the element. In this case, the second indication field may include three first fields. That is, X is equal to 3.

In other words, in the header format shown in FIG. 6, even if the compression node does not use an address compression manner for address information of a forwarding node on the packet forwarding path, a first field corresponding to the address compression manner is still present in the header. However, in the header format shown in FIG. 4, if the compression node does not use an address compression manner for address information of a forwarding node on the packet forwarding path, a first field corresponding to the address compression manner may not be present in the header.

For other fields and/or indication fields included in the header, refer to the descriptions about FIG. 6. Details are not described herein again.

In this implementation, a reserved field of the original extension header may be split into one or more of the following indication fields: the fourth indication field and the fifth indication field. An address list field of the original extension header may be split into the following several portions: the third indication field, the second indication field, the first indication field, and the address information of the destination node. It can be understood that FIG. 5 is merely an example. A position of each indication field in the header and a length (that is, a quantity of occupied bits) of each indication field are not limited in this embodiment of this application.

Using the header format shown in FIG. 4 as an example, the following describes in detail the packet transmission method provided in this embodiment of this application, by using two specific examples. In the following examples, a source node S is a compression node. That is, the source node S uses the IP source routing technology to guide a forwarding node on a packet forwarding path in packet forwarding. The forwarding node in this scenario supports the following two address compression manners.

An address compression manner 1 is an address compression manner of compressing an element by eliminating, from the element, a portion that is the same as a prefix of a first subset to which the element belongs.

An address compression manner 2 is an address compression manner of compressing an element by eliminating, from the element, a portion that is the same as a prefix of address information of the source node or address information of a destination node.

Example 1

Figure 7:
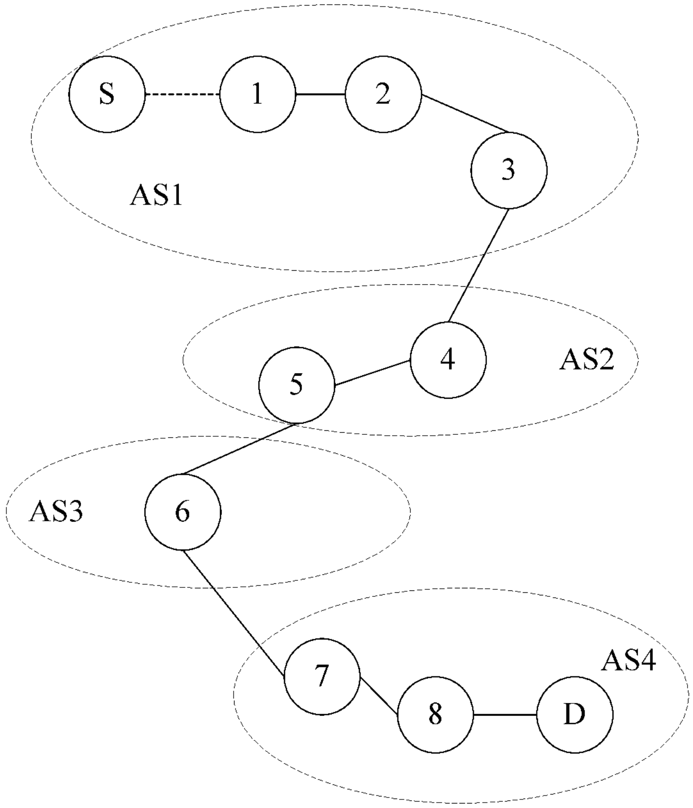
FIG. 7 is a schematic diagram of a packet transmission scenario according to an embodiment of this application.

FIG. 7 is a schematic diagram of a packet transmission scenario according to an embodiment of this application. As shown in FIG. 7, the packet transmission scenario in this embodiment of this application is a wide area network routing scenario in which the IPv6 protocol is used for packet transmission. The scenario includes a source node S, a destination node D, and eight forwarding nodes. In FIG. 7, when a line between two nodes is a dashed line, it indicates that the two nodes are not directly connected; when a line between two nodes is a solid line, it indicates that the two nodes may be or may not be directly connected.

Address information (that is, a hexadecimal IPv6 address) of each node is shown in Table 1.

TABLE 1

| Belonged-to network | Address information | |
|---|---|---|
| Autonomous system AS1 | Address information of the source node S | FC00::ABCD:1234:12FF:FEFF:1111 |
| | Address information of a forwarding node 1 | FC00::ABCD:1234:12FF:FE0F:1234 |
| | Address information of a forwarding node 2 | FC00::ABCD:1234:12FF:FE34:AB12 |
| | Address information of a forwarding node 3 | FC00::ABCD:1234:12FF:FECD:ABCD |
| Autonomous system AS2 | Address information of a forwarding node 4 | FC00::5678:1234:1234:1234:1234 |
| | Address information of a forwarding node 5 | FC00::5678:1234:1234:1256:AB12 |
| Autonomous system AS3 | Address information of a forwarding node 6 | FC00::AAAA:1234:1234:1278:AB12 |
| Autonomous system AS4 | Address information of a forwarding node 7 | FC00::4567:1234:12FF:FE14:1235 |
| | Address information of a forwarding node 8 | FC00::4567:1234:12FF:FE1A:ABEE |
| | Address information of the destination node D | FC00::4567:1234:12FF:FE1A:ABEF |

The following information can be learned from Table 1.

1. The address information of the forwarding node 1 to the address information of the forwarding node 3 and the address information of the source node S belong to one autonomous system (that is, the AS1). Because address information of nodes in one autonomous system has a same prefix, the address compression manner 2 may be used to compress the address information of the forwarding node 1 to the forwarding node 3. Therefore, a compression characteristic of the address information of the forwarding node 1 to the address information of the forwarding node 3 is: having a same prefix as that of the address information of the source node S.

2. The address information of the forwarding node 4 and the address information of the forwarding node 5 belong to one autonomous system (that is, the AS2), to which neither the address information of the source node S nor the address information of the destination node D belong. Because address information of nodes in one autonomous system has a same prefix, the address compression manner 1 may be used to compress the address information of the forwarding node 4 and the forwarding node 5. Therefore, a compression characteristic of the address information of the forwarding node 4 and the address information of the forwarding node 5 is: a prefix of the address information of the forwarding node 4 is the same as a prefix of the address information of the forwarding node 5.

3. The address information of the forwarding node 6 alone belongs to one autonomous system (that is, the AS3). That is, the address information of the forwarding node 6 belongs to the autonomous system to which neither the address information of the source node S nor the address information of the destination node D belongs and to which none of address information of other forwarding nodes belongs. The address information of the forwarding node 6 cannot be compressed. Therefore, the address information of the forwarding node 6 has no compression characteristic.

4. The address information of the forwarding node 7, the address information of the forwarding node 8, and the address information of the destination node D belong to one autonomous system (that is, the AS4). Because address information of nodes in one autonomous system has a same prefix, the address compression manner 2 may be used to compress the address information of the forwarding node 7 and the forwarding node 8. Therefore, a compression characteristic of the address information of the forwarding node 7 and the address information of the forwarding node 8 is: having a same prefix as that of the address information of the destination node D.

In this example, after the source node S obtains address information of forwarding nodes on a packet forwarding path, the source node S may use the address information of the forwarding nodes on the packet forwarding path as an address information set, and divide the address information set into subsets based on a compression characteristic of each element, as specifically shown in Table 2.

TABLE 2

| Address information set | | |
|---|---|---|
| First subset | Element 4 (address information of the forwarding node 4) | FC00::5678:1234:1234:1234:1234 |
| | Element 5 (address information of the forwarding node 5) | FC00::5678:1234:1234:1256:AB12 |
| Second subset | Element 1 (address information of the forwarding node 1) | FC00::ABCD:1234:12FF:FE0F:1234 |
| | Element 2 (address information of the forwarding node 2) | FC00::ABCD:1234:12FF:FE34:AB12 |
| | Element 3 (address information of the forwarding node 3) | FC00::ABCD:1234:12FF:FECD:ABCD |
| | Element 7 (address information of the forwarding node 7) | FC00::4567:1234:12FF:FE14:1235 |

TABLE 2-continued

| Address information set | |
|---|---|
| Element 8 (address information of the forwarding node 8) | FC00::4567:1234:12FF:FE1A:ABEE |
| Element 6 (address information of the forwarding node 6) | FC00::AAAA:1234:1234:1278:AB12 |

In the manner of dividing the address information set shown in Table 2, a prefix of the first subset is 0xFC00:0000:0000:5678:1234:1234:12, which occupies 104 bits in total. It can be understood that the element 6, the element 4, and the element 5 have a same prefix 0xFC00::. Therefore, the element 6, the element 4, and the element 5 may be grouped into one first subset. A specific manner of dividing the address information set may be determined by the compression node based on an actual requirement. In addition, to distinguish between hexadecimal, decimal, and binary systems, in the following, data with a 0b prefix is binary data, data with a 0x prefix is hexadecimal data, and data with no prefix is decimal data. It should be noted that a prefix is used only to indicate a number system of data.

After classifying the elements in the address information set, the source node can compress the elements in the address information set one by one specifically as follows.

Element 1: A prefix of the element 1 is the same as a prefix of the address information of the source node. Therefore, the source node can obtain a compressed element 1 “0x0F1234” by eliminating, from the element 1, the prefix “0xFC00::ABCD:1234:12FF:FE” that is the same as the prefix of the address information of the source node.

Element 2: A prefix of the element 2 is the same as the prefix of the address information of the source node. Therefore, the source node can obtain a compressed element 2 “0x34:AB12” by eliminating, from the element 2, the prefix “0xFC00::ABCD:1234:12FF:FE” that is the same as the prefix of the address information of the source node.

Element 3: A prefix of the element 3 is the same as the prefix of the address information of the source node. Therefore, the source node can obtain a compressed element 3 “0xCD:ABCD” by eliminating, from the element 3, the prefix “0xFC00::ABCD:1234:12FF:FE” that is the same as the prefix of the address information of the source node.

Element 4: The element 4 and the element 5 have a same prefix, and the prefix is a prefix “0xFC00:0000:0000:5678:1234:1234:12” of the first subset. Therefore, the source node can obtain a compressed element 4 “0x34:1234” by eliminating, from the element 4, a portion that is the same as the prefix of the first subset.

Element 5: The element 4 and the element 5 have the same prefix, and the prefix is the prefix “0xFC00:0000:0000:5678:1234:1234:12” of the first subset. Therefore, the source node can obtain a compressed element 5 “0x56:AB12” by eliminating, from the element 5, a portion that is the same as the prefix of the first subset.

Element 7: A prefix of the element 7 is the same as a prefix of the address information of the destination node. Therefore, the source node can obtain a compressed element 3 “0x14:1235” by eliminating, from the element 7, the prefix “0xFC00::4567:1234:12FF:FE” that is the same as the prefix of the address information of the destination node.

Element 8: A prefix of the element 8 is the same as the prefix of the address information of the destination node. Therefore, the source node can obtain a compressed element 8 “0x1A:ABEE” by eliminating, from the element 8, the prefix “0xFC00::4567:1234:12FF:FE” that is the same as the prefix of the address information of the destination node.

Then, the source node can generate a packet based on all of the foregoing compressed elements and the uncompressed element 6, and encapsulate the packet based on the header format shown in FIG. 4. FIG. 8 is a schematic diagram of still another header according to an embodiment of this application. As shown in FIG. 8, fields that are in a header of an encapsulated packet and that are related to this embodiment of this application may be as follows.

1. A field (such as a Segment left field) used to indicate a quantity of remaining nodes on the packet forwarding path: Because there are eight forwarding nodes remaining on the current packet forwarding path, a value of this field may be 8.

2. The second indication field used to indicate the address compression manners used for the elements indicated by the first indication field:

Because the source node supports two address compression manners, the second field of the second indication field of the header may occupy two bits, and the two bits are used to indicate a quantity of address compression manners used by the source node in the packet. Correspondingly, in this embodiment of this application, the source node may use the address compression manner 1 for an element in a first subset, and use the address compression manner 2 for an element in a second subset. That is, a total of two address compression manners may be used. Therefore, the second field of the second indication field may be 11.

The second indication field may include two first fields, one first field corresponds to the address compression manner 1, and one first field corresponds to the address compression manner 2. One bit in each first field corresponds to one element indicated by the first indication field. There are a total of eight elements in this example. Therefore, each first field has eight bits. Each bit corresponds to one element, and is used to indicate whether an address compression manner corresponding to the first field is used for the element.

For example, when the bit is 1, it indicates that the address compression manner corresponding to the first field is used for the element corresponding to the bit, or when the bit is 0, it indicates that the address compression manner corresponding to the first field is not used for the element corresponding to the bit. In this case, the first field corresponding to the compression manner 1 may be 0b00011000, and the first field corresponding to the compression manner 2 may be 0b11100011. The largest bit in each first field indicates the first forwarding node on the forwarding path. The rest may be deduced by analogy.

3. The third indication field used to indicate prefix information of each first subset:

In this example, there is a prefix of only one first subset. Therefore, the third indication field may include one third field. A first portion of the third field is used to indicate a length of the prefix of the first subset, and a second portion of the third field is used to indicate the prefix of the corresponding first subset. A length of the first portion of the third field may be specifically set depending on a requirement.

In this example, the prefix of the first subset is "0xFC00:0000:0000:5678:1234:1234:12", which occupies 104 bits in total. For example, the length of the first portion of the third field is eight bits. In this case, a value of the first portion of the third field may be "0b11100111". The second portion of the third field is "0xFC00:0000:0000:5678:1234:1234:12". (It should be noted that because binary data is excessively long, for ease of understanding, a portion of some field is represented by using the hexadecimal system. However, it can be understood by a person skilled in the art that binary data corresponding to hexadecimal data is transmitted during actual transmission. A reason why hexadecimal representation is used in the following is the same as that herein. Details are not described again.)

In conclusion, a value of the third field is "0b11100111, 0xFC00:0000:0000:5678:1234:1234:12".

It can be understood that when there are a plurality of first subsets, a sequence, of third fields corresponding to prefixes of the first subsets, in the third indication field is not limited in this embodiment of this application.

4. The first indication field used to indicate each compressed element and each uncompressed element:

For example, the first indication field includes at least one fourth field, and each fourth field corresponds to one element indicated by the first indication field. As described in the foregoing, when the element corresponding to the fourth field belongs to a first subset, the fourth field includes a first portion, a second portion, and a third portion, where the first portion of the fourth field is used to indicate a third field corresponding to a prefix of the first subset to which the element belongs, the second portion of the fourth field is used to indicate a length of a compressed element, and the third portion of the fourth field is used to indicate the compressed element; or when the element corresponding to the fourth field belongs to the second subset, the fourth field includes a first portion, a second portion, and a third portion, where the first portion of the fourth field is used to indicate the identifier of the address information of the source node whose prefix is the same as that of the second element or the identifier of the address information of the destination node whose prefix is the same as that of the second element, the second portion of the fourth field is used to indicate a length of a compressed element, and the third portion of the fourth field is used to indicate the compressed element.

Therefore, the source node can write each element into the first indication field based on a sequence of forwarding nodes corresponding to the elements on the forwarding path. For example, the identifier of the address information of the source node is 0, the identifier of the address information of the destination node is 1, and the second portion of the fourth field indicates the length of the compressed element by using seven bits. Specific descriptions are as follows.

The 1$^{st}$ fourth field of the first indication field corresponds to the element 1, the 1$^{st}$ fourth field may include a first portion, a second portion, and a third portion, and the prefix of the element 1 is the same as the prefix of the address information of the source node. Therefore, a value of the first portion of the 1$^{st}$ fourth field is obo. A length of the compressed element 1 is 24 bits. Therefore, a value of the second portion of the 1$^{st}$ fourth field is "0b0011000". The compressed element 1 is "0x0F:1234". Therefore, a value of the third portion of the 1$^{st}$ fourth field is "0x0F:1234". In conclusion, a value of the 1$^{st}$ fourth field is "0b0,0b0011000, 0x0F:1234".

The 2$^{nd}$ fourth field of the first indication field corresponds to the element 2, the 2$^{nd}$ fourth field may include a first portion, a second portion, and a third portion, and the prefix of the element 2 is the same as the prefix of the address information of the source node. Therefore, a value of the first portion of the 2$^{nd}$ fourth field is 0b0. A length of the compressed element 2 is 24 bits. Therefore, a value of the second portion of the 2$^{nd}$ fourth field is "0b001000". The compressed element 2 is "0x34:AB12". Therefore, a value of the third portion of the 2$^{nd}$ fourth field is "0x34:AB12". In conclusion, a value of the 2$^{nd}$ fourth field is "0b0, 0b0011000,0x34:AB12".

The 3$^{rd}$ fourth field of the first indication field corresponds to the element 3, the 3$^{rd}$ fourth field may include a first portion, a second portion, and a third portion, and the prefix of the element 3 is the same as the prefix of the address information of the source node. Therefore, a value of the first portion of the 3$^{rd}$ fourth field is 0b0. A length of the compressed element 3 is 24 bits. Therefore, a value of the second portion of the 3$^{rd}$ fourth field is "0b0011000". The compressed element 3 is "0xCD:ABCD". Therefore, a value of the third portion of the 3$^{rd}$ fourth field is "0xCD:ABCD". In conclusion, a value of the 3$^{rd}$ fourth field is "0b0, 0b0011000,0xCD:ABCD".

The 4$^{th}$ fourth field of the first indication field corresponds to the element 4, the 4$^{th}$ fourth field may include a first portion, a second portion, and a third portion, and the element 4 corresponds to a prefix of the 1$^{st}$ first subset (the only first subset in this example) indicated by the third indication field. Therefore, a value of the first portion of the 4$^{th}$ fourth field is 0b001 (a specific quantity of bits occupied by the first portion may be set based on an actual use requirement). A length of the compressed element 4 is 24 bits. Therefore, a value of the second portion of the 4$^{th}$ fourth field is "0b0011000". The compressed element 4 is "0x34:1234". Therefore, a value of the third portion of the 4$^{th}$ fourth field is "0x34:1234". In conclusion, a value of the 4$^{th}$ fourth field is "0b001,0b0011000,0x34:1234".

The 5$^{th}$ fourth field of the first indication field corresponds to the element 5, the 5$^{th}$ fourth field may include a first portion, a second portion, and a third portion, and the element 5 corresponds to the prefix of the 1$^{st}$ first subset (the only first subset in this example) indicated by the third indication field. Therefore, a value of the first portion of the 5$^{th}$ fourth field is 0b001 (a specific quantity of bits occupied by the first portion may be set based on an actual use requirement). A length of the compressed element 5 is 24 bits. Therefore, a value of the second portion of the 5$^{th}$ fourth field is "0b0011000". The compressed element 4 is "0x34:1234". Therefore, a value of the third portion of the 5$^{th}$ fourth field is "0x34:AB12". In conclusion, a value of the 5$^{th}$ fourth field is "0b001,0b0011000,0x34:AB12".

The 6$^{th}$ fourth field of the first indication field corresponds to the element 6. Because the element 6 is not compressed, a value of the 6$^{th}$ fourth field is the element 6, that is, "0xFC00::AAAA:1234:1234:1278:AB12".

The 7$^{th}$ fourth field of the first indication field corresponds to the element 7, the 7th fourth field may include a first portion, a second portion, and a third portion, and the prefix of the element 7 is the same as the prefix of the address information of the destination node. Therefore, a value of the first portion of the 7$^{th}$ fourth field is obi. A length of the compressed element 7 is 24 bits. Therefore, a value of the second portion of the 7$^{th}$ fourth field is "0b0011000". The compressed element 7 is "0x14:1234". Therefore, a value of the third portion of the $7^{th}$ fourth field is "0x14:1234". In conclusion, a value of the $7^{th}$ fourth field is "0b1,0b0011000, 0x14:1234".

The $8^{th}$ fourth field of the first indication field corresponds to the element 8, the $8^{th}$ fourth field may include a first portion, a second portion, and a third portion, and the prefix of the element 8 is the same as the prefix of the address information of the destination node. Therefore, a value of the first portion of the $8^{th}$ fourth field is 0b1. A length of the compressed element 8 is 24 bits. Therefore, a value of the second portion of the $8^{th}$ fourth field is "0b001000". The compressed element 8 is "0x1A:ABEE". Therefore, a value of the third portion of the $8^{th}$ fourth field is "0x1A:ABEE". In conclusion, a value of the $8^{th}$ fourth field is "0b1, 0b0011000,0x1A:ABEE".

In this example, the first indication field may be further used to indicate an element 9, and the element 9 is the address information of the destination node. That is, the $9^{th}$ fourth field of the first indication field corresponds to the element 9. Because the element 9 is not compressed, a value of the $9^{th}$ fourth field is the element 9, that is, "0xFC00:: 4567:1234:12FF:FE1A:ABEF".

5. The fourth indication field used to indicate the start position of the third indication field in the packet: A value of the indication field is the start position of the third indication field in the packet.

6. The fifth indication field used to indicate a start position of a next element in the first indication field: An initial value of the indication field is a position of the fourth field corresponding to the element 2 in the first indication field.

7. The sixth indication field used to indicate the type of the packet: In this example, a value of the indication field is, for example, 100.

It can be understood that during actual transmission of hexadecimal data in the header, binary data corresponding to the hexadecimal data is transmitted. In addition, a comma and/or a colon in a field are/is only used to signify different portions of the field. During actual transmission and encapsulation, there is no comma and/or colon, or a prefix indicating a number system of the data.

It can be learned from the foregoing descriptions that the source node can compress, in different address compression manners, elements that have different compression characteristics, so as to compress a length of each element to a greater extent, and compress more elements to a greater extent. In this way, when indicating compressed elements by using the first indication field of the packet, the source node can use fewer bits to indicate these elements. This can increase a quantity of forwarding nodes that can be specified by the source node, thereby reducing difficulty in network deployment.

After encapsulating the packet, the source node can forward the packet to the forwarding node 1 based on the address information of the forwarding node 1.

After receiving the packet, the forwarding node 1 may perform the following steps.

Step 1: Determine, based on the field used to indicate a quantity of remaining nodes on the packet forwarding node, that there are eight forwarding nodes remaining on the current packet forwarding path, that is, there are a total of eight forwarding nodes including the forwarding node 1.

Step 2: Parse the sixth indication field to determine that the elements indicated by the first indication field include the compressed elements, and the second indication field needs to be read.

Step 3: Read each first field based on the second field of the second indication field, to determine an address compression manner used by the source node for the address information of the forwarding node 2. For example, a value of the second bit in a first field corresponding to the address compression manner 1 may be read first, to determine whether the value is obi. If the value is obi, it indicates that the source node uses the address compression manner 1 for the address information of the forwarding node 2. If the value is not obi, a value of the second bit in a first field corresponding to the address compression manner 2 is read, to determine whether the value is obi. If the value is obi, it indicates that the source node uses the address compression manner 2 for the address information of the forwarding node 2. If the value is not obi, it indicates that the source node does not use any address compression manner for the address information of the forwarding node 2. In this example, the value of the second bit in the first field corresponding to the address compression manner 2 is obi. That is, the source node uses the address compression manner 2 for the address information of the forwarding node 2.

Step 4: Determine, based on the fifth indication field used to indicate a start position of a next element in the first indication field, a position of compressed address information of the forwarding node 2 in the first indication field, that is, a position of a fourth field corresponding to the forwarding node 2 in the first indication field.

Step 5: Read the fourth field corresponding to the forwarding node 2 from the first indication field based on the position of the compressed address information of the forwarding node 2 in the first indication field.

Step 6: Determine, based on a value 0b0 of a first portion of the fourth field corresponding to the forwarding node 2, that a prefix of the address information of the forwarding node 2 is the same as the prefix of the address information of the source node; determine, based on a value of a second portion of the fourth field corresponding to the forwarding node 2, that a length of the compressed address information of the forwarding node 2 is 24 bits; and then, read 24 bits following the second portion, to obtain a third portion of the fourth field, that is, the compressed address information of the forwarding node 2, namely 0x0F1234.

Step 7: Because a length of complete address information of a forwarding node is 128 bits, read a 104-bit prefix from the address information of the source node carried in the packet, and splice the 104-bit prefix to the front of the compressed address information of the forwarding node 2, to obtain the address information of the forwarding node 2, namely 0xFC00::ABCD:1234:12FF:FE0F:1234.

Step 8: Change a value of the fifth indication field used to indicate a start position of a next element in the first indication field, into a position of a fourth field corresponding to the forwarding node 3 in the first indication field; and change a value of the field used to indicate a quantity of remaining nodes on the packet forwarding path, into 7.

Step 9: Forward the packet to the forwarding node 2 based on the address information of the forwarding node 2.

After receiving the packet sent by the forwarding node 1, the forwarding node 2 can obtain address information of the forwarding node 3 in a manner the same as that of processing the packet by the forwarding node 1, and forward the packet to the forwarding node 3 based on the address information of the forwarding node 3. Details are not described herein again.

After receiving the packet sent by the forwarding node 2, the forwarding node 3 may perform the following steps.

Step 1: Determine, based on the field used to indicate a quantity of remaining nodes on the packet forwarding node, that there are six forwarding nodes remaining on the current packet forwarding path, that is, there are a total of six forwarding nodes including the forwarding node 3.

Step 2: Parse the sixth indication field to determine that the elements indicated by the first indication field include the compressed elements, and the second indication field needs to be read.

Step 3: Read each first field based on the second field of the second indication field, to determine an address compression manner used by the source node for the address information of the forwarding node 4. In this example, the value of the fourth bit in the first field corresponding to the address compression manner 1 is obi. That is, the source node uses the address compression manner 1 for the address information of the forwarding node 4.

Step 4: Determine, based on the fifth indication field used to indicate a start position of a next element in the first indication field, a position of compressed address information of the forwarding node 4 in the first indication field, that is, a position of a fourth field corresponding to the forwarding node 4 in the first indication field.

Step 5: Read the fourth field corresponding to the forwarding node 4 from the first indication field based on the position of the compressed address information of the forwarding node 4 in the first indication field.

Step 6: Determine, based on a value 0b001 of a first portion of the fourth field corresponding to the forwarding node 4, that a prefix of the address information of the forwarding node 4 is the same as that of the 1$^{st}$ first subset indicated by the third indication field; determine, based a value of a second portion of the fourth field corresponding to the forwarding node 4, that a length of compressed address information of the forwarding node 4 is 24 bits; and then, read 24 bits following the second portion, to obtain a third portion of the fourth field, that is, the compressed address information of the forwarding node 4, namely 0x34:1234.

Step 7: Determine, based on a value of the fourth indication field used to indicate the start position of the third indication field in the packet, the start position of the third indication field in the packet, that is, a start position of a third field corresponding to the prefix of the 1$^{st}$ first subset in the packet.

Step 8: Read, based on the start position of the third field corresponding to the prefix of the 1$^{st}$ first subset in the packet, the third field corresponding to the prefix of the 1$^{st}$ first subset; determine, based on a first portion of the third field, that a length of the prefix of the first subset is 104 bits; and then, read 104 bits following the first portion, to obtain a second portion of the third field, that is, the prefix of the first subset, namely 0xFC00:0000:0000:5678:1234:1234:12.

Step 9: Splice the prefix of the first subset to the front of the compressed address information of the forwarding node 4, to obtain the address information of the forwarding node 4, namely 0xFC00::5678:1234:1234:1234:1234.

Step 10: Change a value of the fifth indication field used to indicate a start position of a next element in the first indication field, into a position of a fourth field corresponding to the forwarding node 5 in the first indication field; and change a value of the field used to indicate a quantity of remaining nodes on the packet forwarding path, into 5.

Step 9: Forward the packet to the forwarding node 4 based on the address information of the forwarding node 4.

After receiving the packet sent by the forwarding node 3, the forwarding node 4 can obtain address information of the forwarding node 5 in the manner the same as that of processing the packet by the forwarding node 3, and forward the packet to the forwarding node 5 based on the address information of the forwarding node 5. Details are not described herein again.

After receiving the packet sent by the forwarding node 4, the forwarding node 5 may perform the following steps.

Step 1: Determine, based on the field used to indicate a quantity of remaining nodes on the packet forwarding node, that there are four forwarding nodes remaining on the current packet forwarding path, that is, there are a total of four forwarding nodes including the forwarding node 5.

Step 2: Parse the sixth indication field to determine that the elements indicated by the first indication field include the compressed elements, and the second indication field needs to be read.

Step 3: Read each first field based on the second field of the second indication field, to determine an address compression manner used by the source node for the address information of the forwarding node 6. In this example, a value of the sixth bit in the first field corresponding to the address compression manner 1 is 0b0, and a value of the sixth bit in the first field corresponding to the address compression manner 2 is 0b0. That is, the source node does not use any address compression manner for the address information of the forwarding node 6.

Step 4: Determine, based on the fifth indication field used to indicate a start position of a next element in the first indication field, a position of the address information of the forwarding node 6 in the first indication field, that is, a position of a fourth field corresponding to the forwarding node 6 in the first indication field.

Step 5: Read 128-bit data from the first indication field based on the position of the address information of the forwarding node 6 in the first indication field, where the 128-bit data is the fourth field corresponding to the forwarding node 6, that is, the address information of the forwarding node 6 is 0xFC00::AAAA:1234:1234:1278:AB12.

Step 6: Change a value of the fifth indication field used to indicate a start position of a next element in the first indication field, into a position of a fourth field corresponding to the forwarding node 7 in the first indication field; and change a value of the field used to indicate a quantity of remaining nodes on the packet forwarding path, into 3.

Step 9: Forward the packet to the forwarding node 6 based on the address information of the forwarding node 6.

After receiving the packet, the forwarding node 6 may perform the following steps.

Step 1: Determine, based on the field used to indicate a quantity of remaining nodes on the packet forwarding node, that there are three forwarding nodes remaining on the current packet forwarding path, that is, there are a total of three forwarding nodes including the forwarding node 6.

Step 2: Parse the sixth indication field to determine that the elements indicated by the first indication field include the compressed elements, and the second indication field needs to be read.

Step 3: Read each first field based on the second field of the second indication field, to determine an address compression manner used by the source node for the address information of the forwarding node 7. In this example, a value of the seventh bit in the first field corresponding to the address compression manner 2 is obi. That is, the source node uses the address compression manner 2 for the address information of the forwarding node 7.

Step 4: Determine, based on the fifth indication field used to indicate a start position of a next element in the first indication field, a position of compressed address information of the forwarding node 7 in the first indication field, that is, a position of a fourth field corresponding to the forwarding node 7 in the first indication field.

Step 5: Read the fourth field corresponding to the forwarding node 7 from the first indication field based on the position of the compressed address information of the forwarding node 7 in the first indication field.

Step 6: Determine, based on a value obi of a first portion of the fourth field corresponding to the forwarding node 7, that a prefix of the address information of the forwarding node 7 is the same as the prefix of the address information of the destination node; determine, based on a value of a second portion of the fourth field corresponding to the forwarding node 7, that a length of the compressed address information of the forwarding node 7 is 24 bits; and then, read 24 bits following the second portion, to obtain a third portion of the fourth field, that is, the compressed address information of the forwarding node 7, namely 0x141235.

Step 7: Because a length of complete address information of a forwarding node is 128 bits, read a 104-bit prefix from the address information of the destination node carried in the packet, and splice the 104-bit prefix to the front of the compressed address information of the forwarding node 7, to obtain the address information of the forwarding node 7, namely 0xFC00::4567:1234:12FF:FE14:1235.

Step 8: Change a value of the fifth indication field used to indicate a start position of a next element in the first indication field, into a position of a fourth field corresponding to the forwarding node 7 in the first indication field; and change a value of the field used to indicate a quantity of remaining nodes on the packet forwarding path, into 2.

Step 9: Forward the packet to the forwarding node 7 based on the address information of the forwarding node 7.

After receiving the packet sent by the forwarding node 6, the forwarding node 7 can obtain address information of the forwarding node 8 in the manner the same as that of processing the packet by the forwarding node 6, and forward the packet to the forwarding node 8 based on the address information of the forwarding node 8. Details are not described herein again.

After receiving the packet, the forwarding node 8 may perform the following steps.

Step 1: Determine, based on the field used to indicate a quantity of remaining nodes on the packet forwarding node, that there is one forwarding node remaining on the current packet forwarding path, that is, there is a total of one forwarding node including the forwarding node 8, and there is no subsequent forwarding node. Therefore, the fifth indication field can be read directly.

Step 2: Determine, based on the fifth indication field used to indicate a start position of a next element in the first indication field, a position of the address information of the destination node in the first indication field, that is, a position of a fourth field corresponding to the destination node D in the first indication field.

Step 3: Read 128-bit data from the first indication field based on the position of the address information of the destination node D in the first indication field, where the 128-bit data is the fourth field corresponding to the destination node D, that is, the address information of the destination node D, namely 0xFC00::4567:1234:12FF:FE1A:ABEF.

Step 4: Change a value of the fifth indication field used to indicate a start position of a next element in the first indication field, into a position of the fourth field corresponding to the destination node in the first indication field; and change a value of the field used to indicate a quantity of remaining nodes on the packet forwarding path, into 0.

Step 5: Forward the packet to the destination node D based on the address information of the destination node D.

After receiving the packet, the destination node D determines, based on the field used to indicate the quantity of remaining nodes on the packet forwarding path, that there is no forwarding node remaining on the current packet forwarding path, and thereby determines that the destination node D is a final destination address of the packet. The destination node D may parse and process the packet in a prior-art manner, without further forwarding the packet.

Example 2

FIG. 9 is a schematic diagram of another packet transmission scenario according to an embodiment of this application. As shown in FIG. 9, the packet transmission scenario in this embodiment of this application is an IoT smart meter scenario in which the IPv6 protocol is used for packet transmission. The scenario includes a source node (that is, a gateway), a destination node D, and three forwarding nodes (a forwarding node A to a forwarding node C). The destination node D and the forwarding nodes are all IoT nodes. In FIG. 9, when a line between two nodes is a dashed line, it indicates that the two nodes are not directly connected; when a line between two nodes is a solid line, it indicates that the two nodes may be or may not be directly connected.

In this example, the IoT smart meter scenario is a closed local area network scenario. That is, the intra-area IoT nodes and gateway have a same prefix FC00:/80. The forwarding node A to the forwarding node C are incrementally deployed IoT nodes. That is, the forwarding node A to the forwarding node C are devices deployed in the scenario in different batches. For example, the forwarding node A is a device deployed in the first batch, the forwarding node B is a device deployed in the second batch, and the forwarding node C is a device deployed in the third batch.

Because the forwarding node A to the forwarding node C are devices deployed in a local area network in different batches, when a quantity of devices in the local area network increases, a device that is deployed in the local area network in a later batch has a longer short address (that is, an address, in address information, other than a prefix that is the same as the prefix of address information of the gateway).

Assuming that a short address of the forwarding node A occupies eight bits, a short address of the forwarding node B occupies 12 bits, and a short address of the forwarding node C occupies 16 bits, address information (that is, a hexadecimal IPv6 address) of each node is shown in Table 3.

TABLE 3

| Address information | |
|---|---|
| Address information of the source node (the gateway) | FC00:: |
| Address information of the forwarding node A | FC00::15 |
| Address information of the forwarding node B | FC00::10A |
| Address information of the forwarding node C | FC00::1FF0 |
| Address information of the destination node D | FC00::AABEF |

It can be learned from Table 3 that the address information of the forwarding node A to the address information of the forwarding node C each has the same prefix as that of the address information of the source node (the gateway), and the address compression manner 1 may be used to compress the address information of the forwarding node A to the forwarding node C. Therefore, a compression characteristic of the address information of the forwarding node A to the address information of the forwarding node C is: having the same prefix as that of the address information of the source node (the gateway).

In this example, after the source node (the gateway) obtains address information of the forwarding nodes on a packet forwarding path, the source node (the gateway) can use the address information of the forwarding nodes on the packet forwarding path as an address information set, and divide the address information set into subsets based on a compression characteristic of each element, as specifically shown in Table 4.

TABLE 4

| Address information set | | |
|---|---|---|
| Second subset | Element 1 (the address information of the forwarding node A) | FC00::15 |
| | Element 2 (the address information of the forwarding node B) | FC00::10A |
| | Element 3 (the address information of the forwarding node C) | FC00::1FF0 |

After classifying the elements in the address information set, the source node can compress the elements in the address information set one by one specifically as follows.

Element 1: The prefix of the element 1 is the same as the prefix of the address information of the source node. Therefore, the source node can obtain a compressed element 1 "0x15" by eliminating, from the element 1, the prefix "0xFC00::" that is the same as the prefix of the address information of the source node.

Element 2: The prefix of the element 2 is the same as the prefix of the address information of the source node. Therefore, the source node can obtain a compressed element 2 "0x10A" by eliminating, from the element 2, the prefix "0xFC00::" that is the same as the prefix of the address information of the source node.

Element 3: The prefix of the element 3 is the same as the prefix of the address information of the source node. Therefore, the source node can obtain a compressed element 3 "0x1FF0" by eliminating, from the element 3, a prefix "0xFC00::" that is the same as the prefix of the address information of the source node.

Then, the source node can generate a packet based on the foregoing compressed elements, and encapsulate the packet based on the header format shown in FIG. 4. FIG. 10 is a schematic diagram of still another header according to an embodiment of this application. As shown in FIG. 10, fields that are in a header of an encapsulated packet and that are related to this embodiment of this application may be as follows.

1. A field (such as a Segment left field) used to indicate a quantity of remaining nodes on the packet forwarding path: Because there are three forwarding nodes remaining on the current packet forwarding path, a value of this field may be 3.

2. The second indication field used to indicate the address compression manners used for the elements indicated by the first indication field:

Because the source node supports two address compression manners, a second field of the second indication field of the header may occupy two bits, and the two bits are used to indicate a quantity of address compression manners used by the source node in the packet. Correspondingly, in this example, the source node uses the address compression manner 2 for an element in the second subset. That is, a total of one compression manner is used. Therefore, the second field of the second indication field may be, for example, 0b01 or 0b10. This can be specifically determined based on a setting of a communications system. FIG. 10 is a schematic diagram in which a value of the second field is 0b10.

The second indication field may include two first fields, one first field corresponds to the address compression manner 1, and one first field corresponds to the address compression manner 2. One bit in each first field corresponds to one element indicated by the first indication field. There are a total of three elements in this example. Therefore, each first field has three bits. Each bit corresponds to one element, and is used to indicate whether an address compression manner corresponding to the first field is used for the element. In another implementation, the address compression manner 1 is not used during sending of the packet, and therefore, the second indication field may include only the first field corresponding to the address compression manner 2, and there is no first field corresponding to the address compression manner 1. FIG. 10 is a schematic diagram of an example in which the second indication field includes two first fields. The first field that corresponds to the address compression manner 1 and that is filled with dots indicates that the first field may not be present in the current header.

For example, when the bit is 1, it indicates that the address compression manner corresponding to the first field is used for the element corresponding to the bit, or when the bit is 0, it indicates that the address compression manner corresponding to the first field is not used for the element corresponding to the bit. In this case, the first field corresponding to the compression manner 2 may be 0b111. The largest bit in the first field indicates the first forwarding node on the forwarding path. The rest may be deduced by analogy.

3. A third indication field used to indicate prefix information of each first subset:

Because the address compression manner 1 is not used during sending of the packet, there is no prefix of the first subset. Therefore, the third indication field may be empty, or the header does not include the third indication field. FIG. 10 is a schematic diagram in which the header includes the third indication field. The third indication field filled with dots indicates that the indication field may not be present in the current header.

4. The first indication field used to indicate each compressed element and each uncompressed element:

For example, the first indication field includes at least one fourth field, and each fourth field corresponds to one element indicated by the first indication field. As described in the foregoing, when the element corresponding to the fourth field belongs to the second subset, the fourth field includes a first portion, a second portion, and a third portion, where the first portion of the fourth field is used to indicate an identifier of the address information of the source node whose prefix is the same as that of the second element or an identifier of the address information of the destination node whose prefix is the same as that of the second element, the second portion of the fourth field is used to indicate a length of a compressed element, and the third portion of the fourth field is used to indicate the compressed element.

Therefore, the source node can write each element into the first indication field based on a sequence of forwarding nodes corresponding to the elements on the forwarding path. For example, the identifier of the address information of the source node is 0, and the second portion of the fourth field indicates the length of the compressed element by using seven bits. Specific descriptions are as follows.

The 1$^{st}$ fourth field of the first indication field corresponds to the element 1, the 1$^{st}$ fourth field may include a first portion, a second portion, and a third portion, and a prefix of the element 1 is the same as the prefix of the address information of the source node. Therefore, a value of the first portion of the 1st fourth field is 0b0. A length of the compressed element 1 is eight bits. Therefore, a value of the second portion of the 1st fourth field is "0b0001000". The compressed element 1 is "0x15". Therefore, a value of the third portion of the 1st fourth field is "0b00001111". In conclusion, a value of the 1st fourth field is "0b0,0b0001000, 0b00001111".

The 2nd fourth field of the first indication field corresponds to the element 2, the 2nd fourth field may include a first portion, a second portion, and a third portion, and a prefix of the element 2 is the same as the prefix of the address information of the source node. Therefore, a value of the first portion of the 2nd fourth field is 0b0. A length of the compressed element 2 is 12 bits. Therefore, a value of the second portion of the 2nd fourth field is "0b0001100". The compressed element 2 is "0x10A". Therefore, a value of the third portion of the 2nd fourth field is "0b000100001010". In conclusion, a value of the 2nd fourth field is "0b0, 0b0001100,0b000100001010".

The 3rd fourth field of the first indication field corresponds to the element 3, the 3rd fourth field may include a first portion, a second portion, and a third portion, and a prefix of the element 3 is the same as the prefix of the address information of the source node. Therefore, a value of the first portion of the 3rd fourth field is 0b0. A length of the compressed element 3 is 16 bits. Therefore, a value of the second portion of the 3rd fourth field is "0b0010000". The compressed element 3 is "0x1FF0". Therefore, a value of the third portion of the 3rd fourth field is "0b0001111111110000". In conclusion, a value of the 3rd fourth field is "0b0,0b0010000,0b0001111111110000".

In this example, the first indication field may be further used to indicate an element 4, and the element 4 is the address information of the destination node. That is, the 4th fourth field of the first indication field corresponds to the element 4. Because the element 4 is not compressed, a value of the 4th fourth field is the element 4, that is, "0xFC00:: 1FF0".

5. The fourth indication field used to indicate the start position of the third indication field in the packet: A value of the indication field is the start position of the third indication field in the packet.

Because the third indication field may be empty, or the header does not include the third indication field, the fourth indication field used to indicate the start position of the third indication field in the packet may also be empty, or the header does not include the fourth indication field. FIG. 10 is a schematic diagram in which the header includes the fourth indication field. The fourth indication field filled with dots indicates that the indication field may not be present in the current header.

6. The fifth indication field used to indicate a start position of a next element in the first indication field: An initial value of the indication field is a position of the fourth field corresponding to the element 2 in the first indication field.

7. The sixth indication field used to indicate the type of the packet: In this example, a value of the indication field is, for example, 100.

It can be understood that during actual transmission of hexadecimal data in the header, binary data corresponding to the hexadecimal data is transmitted. In addition, a comma and/or a colon in a field are/is only used to signify different portions of the field. During actual transmission and encapsulation, there is no comma and/or colon, or a prefix indicating a number system of the data.

It can be learned from the foregoing descriptions that the source node can compress, in different address compression manners, elements that have different compression characteristics, so as to compress a length of each element to a greater extent, and compress more elements to a greater extent. In this way, when indicating compressed elements by using the first indication field of the packet, the source node can use fewer bits to indicate these elements. This can increase a quantity of forwarding nodes that can be specified by the source node, thereby reducing difficulty in network deployment.

After encapsulating the packet, the source node can forward the packet to the forwarding node A through a forwarding node X. For how the forwarding X obtains the address information of the forwarding node A, refer to the prior art.

After receiving the packet, the forwarding node A may perform the following steps.

Step 1: Determine, based on the field used to indicate a quantity of remaining nodes on the packet forwarding node, that there are three forwarding nodes remaining on the current packet forwarding path, that is, there are a total of three forwarding nodes including the forwarding node A.

Step 2: Parse the sixth indication field to determine that the elements indicated by the first indication field include the compressed elements, and the second indication field needs to be read.

Step 3: Read the first field corresponding to the address compression manner 2 based on the second field of the second indication field, to determine an address compression manner used by the source node for the address information of the forwarding node B. In this example, a value of the second bit in the first field corresponding to the address compression manner 2 is obi. That is, the source node uses the address compression manner 2 for the address information of the forwarding node B.

Step 4: Determine, based on the fifth indication field used to indicate a start position of a next element in the first indication field, a position of compressed address information of the forwarding node B in the first indication field, that is, a position of a fourth field corresponding to the forwarding node B in the first indication field.

Step 5: Read the fourth field corresponding to the forwarding node B from the first indication field based on the position of the compressed address information of the forwarding node B in the first indication field.

Step 6: Determine, based on a value 0b0 of a first portion of the fourth field corresponding to the forwarding node B, that the prefix of the address information of the forwarding node B is the same as the prefix of the address information of the source node; determine, based on a value of a second portion of the fourth field corresponding to the forwarding node B, that a length of the compressed address information of the forwarding node B is eight bits; and then, read eight bits following the second portion, to obtain a third portion of the fourth field, that is, the compressed address information of the forwarding node B, namely 0x15.

Step 7: Because a length of complete address information of a forwarding node is 128 bits, read a 120-bit prefix from the address information of the source node carried in the packet, and splice the 120-bit prefix to the front of the compressed address information of the forwarding node B, to obtain the address information of the forwarding node B, namely 0xFC00::15.

Step 8: Change a value of the fifth indication field used to indicate a start position of a next element in the first indication field, into a position of a fourth field corresponding to the forwarding node C in the first indication field; and change a value of the field used to indicate a quantity of remaining nodes on the packet forwarding path, into 2.

Step 9: Forward the packet to the forwarding node B based on the address information of the forwarding node B.

After receiving the packet sent by the forwarding node A, the forwarding node B can obtain the address information of the forwarding node C in the manner the same as that of processing the packet by the forwarding node A, and forward the packet to the forwarding node C based on the address information of the forwarding node C. Details are not described herein again.

After receiving the packet sent by the forwarding node B, the forwarding node C may perform the following steps.

Step 1: Determine, based on the field used to indicate a quantity of remaining nodes on the packet forwarding node, that there is one forwarding node remaining on the current packet forwarding path, that is, there is a total of one forwarding node including the forwarding node C, and there is no subsequent forwarding node. Therefore, the fifth indication field can be read directly.

Step 2: Determine, based on the fifth indication field used to indicate a start position of a next element in the first indication field, a position of the address information of the destination node in the first indication field, that is, a position of a fourth field corresponding to the destination node D in the first indication field.

Step 3: Read 128-bit data from the first indication field based on the position of the address information of the destination node D in the first indication field, where the 128-bit data is the fourth field corresponding to the destination node D, that is, the address information of the destination node D, namely 0xFC00::AABEF.

Step 4: Change a value of the fifth indication field used to indicate a start position of a next element in the first indication field, into a position of the fourth field corresponding to the destination node in the first indication field; and change a value of the field used to indicate a quantity of remaining nodes on the packet forwarding path, into 0.

Step 5: Forward the packet to the destination node D based on the address information of the destination node D.

After receiving the packet, the destination node D determines, based on the field used to indicate the quantity of remaining nodes on the packet forwarding path, that there is no forwarding node remaining on the current packet forwarding path, and thereby determines that the destination node D is a final destination address of the packet. The destination node D may parse and process the packet in a prior-art manner, without further forwarding the packet.

According to the packet transmission method provided in this embodiment of this application, when the IPv6 protocol is used for packet transmission, and an IP source routing technology is used to guide the forwarding nodes on the packet forwarding path in packet forwarding, different address compression manners may be used to compress address information of forwarding nodes that has different compression characteristics, so as to compress address information of more forwarding nodes to the maximum extent, so that lengths of compressed address information of the forwarding nodes are each less than 128 bits, and IP source routing is implemented by indicating the compressed address information by using the first indication field of the packet. In this way, when a length of the packet remains unchanged, a quantity of indicated elements can be increased. This can increase a quantity of forwarding nodes that can be specified, thereby reducing difficulty in network deployment.

Figure 11:
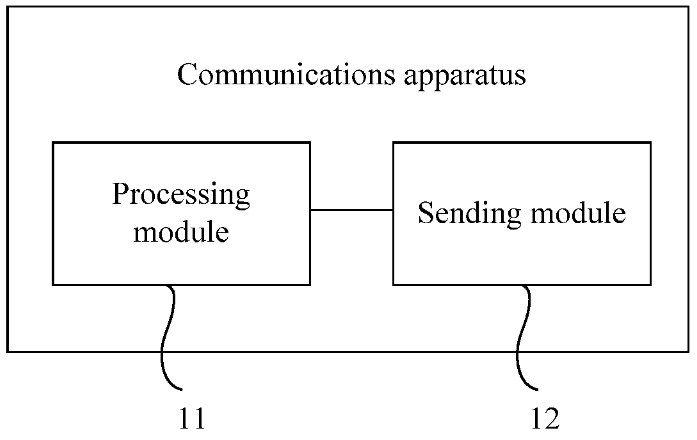
FIG. 11 is a schematic structural diagram of a communications apparatus according to an embodiment of this application.

FIG. 11 is a schematic structural diagram of a communications apparatus according to an embodiment of this application. The communications apparatus implements, by using software, hardware, or a combination thereof, some or all functions of the foregoing compression node. The communications apparatus may be the compression node, or may be a chip that is applied to the compression node. As shown in FIG. 11, the communications apparatus may include a processing module 11 and a sending module 12, where the processing module 11 is configured to generate a packet based on address information of forwarding nodes on a packet forwarding path, where the packet includes a first indication field, the first indication field is used to indicate a compressed first element and a compressed second element, the first element and the second element are address information of different forwarding nodes, and different address compression manners are used for the first element and the second element; and the sending module 11 is configured to send the packet.

In an implementation, the address information of the forwarding nodes on the packet forwarding path is an address information set, address information of each forwarding node is one element, the address information set includes at least two first subsets, each first subset includes at least two elements, and a common prefix shared by the elements in the first subset is a prefix of the first subset; and that different address compression manners are used for the first element and the second element includes: the first element and the second element belong to different first subsets, and a prefix of a first subset to which the first element belongs is different from a prefix of a first subset to which the second element belongs; an address compression manner used for the first element is: eliminating, from the first element, a portion that is the same as the prefix of the first subset to which the first element belongs, to obtain the compressed first element; and an address compression manner used for the second element is: eliminating, from the second element, a portion that is the same as the prefix of the first subset to which the second element belongs, to obtain the compressed second element.

In an implementation, the first indication field is further used to indicate a compressed third element, the third element is address information of a forwarding node, and an address compression manner used for the third element is different from that used for each of the first element and the second element; the address information set further includes a second subset, the second subset includes at least one element, the element included in the second subset is different from the elements included in the first subset, and a prefix of each element in the second subset is the same as that of address information of a source node or address information of a destination node; and that an address compression manner used for the third element is different from that used for each of the first element and the second element includes: the third element belongs to the second subset; and the address compression manner used for the third element is: eliminating, from the third element, a portion that is the same as the prefix of the address information of the source node, to obtain the compressed third element; or eliminating, from the third element, a portion that is the same as the prefix of the address information of the destination node, to obtain the compressed third element.

In an implementation, the first indication field is further used to indicate a compressed third element, the third element is address information of a forwarding node, and an address compression manner used for the third element is different from that used for each of the first element and the second element; the address information set further includes the third element, the third element does not belong to the first subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

In an implementation, the address information of the forwarding nodes on the packet forwarding path is an address information set, address information of each forwarding node is one element, the address information set includes a second subset and at least one first subset, the second subset includes at least one element, each first subset includes at least two elements, the element included in the second subset is different from the elements included in the at least one first subset, a common prefix shared by the elements in each first subset is a prefix of the first subset, and a prefix and prefix length of each element in the second subset are the same as those of address information of a source node or address information of a destination node; and that different address compression manners are used for the first element and the second element includes: the first element belongs to a first subset, and the second element belongs to the second subset; an address compression manner used for the first element is: eliminating, from the first element, a portion that is the same as a prefix of the first subset to which the first element belongs, to obtain the compressed first element; and an address compression manner used for the second element is: eliminating, from the second element, a portion that is the same as the prefix of the address information of the source node, to obtain the compressed second element; or eliminating, from the second element, a portion that is the same as the prefix of the address information of the destination node, to obtain the compressed second element.

In an implementation, the first indication field is further used to indicate a compressed third element, the third element is address information of a forwarding node, and an address compression manner used for the third element is different from that used for each of the first element and the second element; the address information set further includes the third element, the third element does not belong to the first subset or the second subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

In an implementation, the address information of the forwarding nodes on the packet forwarding path is an address information set, address information of each forwarding node is one element, the address information set includes at least one first subset and the second element, each first subset includes at least two elements, a common prefix shared by the elements in the first subset is a prefix of the first subset, and the second element shares a common portion with a media access control MAC address of a forwarding node corresponding to each second element; and that different address compression manners are used for the first element and the second element includes: the first element belongs to a first subset; an address compression manner used for the first element is: eliminating, from the first element, a portion that is the same as a prefix of the first subset to which the first element belongs, to obtain the compressed first element; and an address compression manner used for the second element is: eliminating, from the second element, the common portion shared with the MAC address of the forwarding node corresponding to the second element, to obtain the compressed second element.

In an implementation, the address information of the forwarding nodes on the packet forwarding path is an address information set, address information of each forwarding node is one element, the address information set includes a second subset and the second element, the second subset includes at least one element, a prefix and prefix length of each element in the second subset are the same as those of address information of a source node or address information of a destination node, and the second element shares a common portion with a media access control MAC address of a forwarding node corresponding to each second element; and that different address compression manners are used for the first element and the second element includes: the first element belongs to the second subset; an address compression manner used for the first element is: eliminating, from the first element, a portion that is the same as the prefix of the address information of the source node, to obtain the compressed first element; or eliminating, from the first element, a portion that is the same as the prefix of the address information of the destination node, to obtain the compressed first element; and an address compression manner used for the second element is: eliminating, from the second element, the common portion shared with the MAC address of the forwarding node corresponding to the second element, to obtain the compressed second element.

In an implementation, the first indication field is further used to indicate a fourth element, and the fourth element is uncompressed address information of a forwarding node on the packet forwarding path.

In an implementation, the packet further includes a second indication field, and the second indication field is used to indicate address compression manners used for the elements indicated by the first indication field.

For example, the second indication field includes at least one first field, each first field corresponds to one address compression manner, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

For another example, the second indication field includes a second field and N first fields, where N is an integer greater than or equal to 1; the second field is used to indicate that a total of N address compression manners are used for the elements indicated by the first indication field; and each first field corresponds to one of the N address compression manners, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

For another example, the packet includes a second indication field corresponding to each element indicated by the first indication field, and the second indication field is used to indicate an address compression manner used for the corresponding element.

In an implementation, the packet further includes a third indication field, and the third indication field is used to indicate prefix information of each first subset. For example, the third indication field includes at least one third field, each third field corresponds to a prefix of one first subset, and each third field includes a first portion and a second portion, where the first portion of the third field is used to indicate a length of the prefix of the corresponding first subset, and the second portion of the third field is used to indicate the prefix of the corresponding first subset.

In an implementation, the first indication field includes at least one fourth field, and each fourth field corresponds to one element indicated by the first indication field; and when the element corresponding to the fourth field belongs to the first subset, the fourth field includes a first portion, a second portion, and a third portion, where the first portion of the fourth field is used to indicate a third field corresponding to a prefix of the first subset to which the element belongs, the second portion of the fourth field is used to indicate a length of a compressed element, and the third portion of the fourth field is used to indicate the compressed element; or when the element corresponding to the fourth field belongs to the second subset, the fourth field includes a first portion, a second portion, and a third portion, where the first portion of the fourth field is used to indicate an identifier of the address information of the source node whose prefix is the same as that of the second element or an identifier of the address information of the destination node whose prefix is the same as that of the second element, the second portion of the fourth field is used to indicate a length of a compressed element, and the third portion of the fourth field is used to indicate the compressed element; or when the element corresponding to the fourth field shares a common portion with a media access control MAC address of a forwarding node corresponding to the element, the fourth field includes a first portion and a second portion, where the first portion of the fourth field is used to indicate a length of a compressed element, and the second portion of the fourth field is used to indicate the compressed element.

In an implementation, the packet further includes a fourth indication field, and the fourth indication field is used to indicate a start position of the third indication field in the packet.

In an implementation, the packet further includes a fifth indication field, and the fifth indication field is used to indicate a start position of a next element in the first indication field, where a node corresponding to the next element is a next node forwarding or receiving the packet on the packet forwarding path.

In an implementation, the packet further includes a sixth indication field, and the sixth indication field is used to indicate a type of the packet, where the type of the packet is used to indicate that the elements indicated by the first indication field include a compressed element.

The communications apparatus provided in this embodiment of this application can perform the actions on a compression node side in the foregoing method embodiment. An implementation principle and a technical effect of the communications apparatus are similar to those of the method embodiment. Details are not described herein again.

Figure 12:
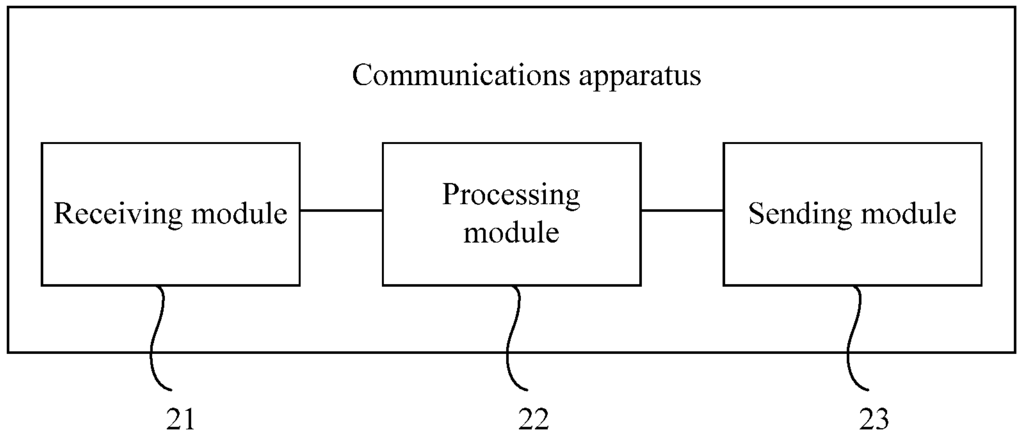
FIG. 12 is a schematic structural diagram of another communications apparatus according to an embodiment of this application.

FIG. 12 is a schematic structural diagram of another communications apparatus according to an embodiment of this application. The communications apparatus implements, by using software, hardware, or a combination thereof, some or all functions of the foregoing forwarding node receiving the packet. The communications apparatus may be the forwarding node, or may be a chip that is applied to the forwarding node. As shown in FIG. 12, the communications apparatus may include a receiving module 21, a processing module 22, and a sending module 23, where the receiving module 21 is configured to receive a packet, where the packet includes a first indication field, the first indication field is used to indicate a compressed first element and a compressed second element, the first element and the second element are address information of different forwarding nodes on a packet forwarding path, and different address compression manners are used for the first element and the second element;

the processing module 22 is configured to determine address information of a next forwarding node based on the first indication field; and the sending module 23 is configured to send the packet to the next forwarding node based on the address information of the next forwarding node.

In an implementation, address information of forwarding nodes on the packet forwarding path is an address information set, address information of each forwarding node is one element, the address information set includes at least two first subsets, each first subset includes at least two elements, and a common prefix shared by the elements in the first subset is a prefix of the first subset; and that different address compression manners are used for the first element and the second element includes: the first element and the second element belong to different first subsets, and a prefix of a first subset to which the first element belongs is different from a prefix of a first subset to which the second element belongs; an address compression manner used for the first element is: eliminating, from the first element, a portion that is the same as the prefix of the first subset to which the first element belongs, to obtain the compressed first element; and an address compression manner used for the second element is: eliminating, from the second element, a portion that is the same as the prefix of the first subset to which the second element belongs, to obtain the compressed second element.

In an implementation, the first indication field is further used to indicate a compressed third element, the third element is address information of a forwarding node, and an address compression manner used for the third element is different from that used for each of the first element and the second element; the address information set further includes a second subset, the second subset includes at least one element, the element included in the second subset is different from the elements included in the first subset, and a prefix of each element in the second subset is the same as that of address information of a source node or address information of a destination node; and that an address compression manner used for the third element is different from that used for each of the first element and the second element includes: the third element belongs to the second subset; and the address compression manner used for the third element is: eliminating, from the third element, a portion that is the same as the prefix of the address information of the source node, to obtain the compressed third element; or eliminating, from the third element, a portion that is the same as the prefix of the address information of the destination node, to obtain the compressed third element.

In an implementation, the first indication field is further used to indicate a compressed third element, the third element is address information of a forwarding node, and an address compression manner used for the third element is different from that used for each of the first element and the second element; the address information set further includes the third element, the third element does not belong to the first subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

In an implementation, address information of forwarding nodes on the packet forwarding path is an address information set, address information of each forwarding node is one element, the address information set includes a second subset and at least one first subset, the second subset includes at least one element, each first subset includes at least two elements, the element included in the second subset is different from the elements included in the at least one first subset, a common prefix shared by the elements in each first subset is a prefix of the first subset, and a prefix and prefix length of each element in the second subset are the same as those of address information of a source node or address information of a destination node; and that different address compression manners are used for the first element and the second element includes: the first element belongs to a first subset, and the second element belongs to the second subset; an address compression manner used for the first element is: eliminating, from the first element, a portion that is the same as a prefix of the first subset to which the first element belongs, to obtain the compressed first element; and an address compression manner used for the second element is: eliminating, from the second element, a portion that is the same as the prefix of the address information of the source node, to obtain the compressed second element; or eliminating, from the second element, a portion that is the same as the prefix of the address information of the destination node, to obtain the compressed second element.

In an implementation, the first indication field is further used to indicate a compressed third element, the third element is address information of a forwarding node, and an address compression manner used for the third element is different from that used for each of the first element and the second element; the address information set further includes the third element, the third element does not belong to the first subset or the second subset, and the third element shares a common portion with a media access control MAC address of the forwarding node corresponding to each third element; and that an address compression manner used for the third element is different from that used for each of the first element and the second element includes: the address compression manner used for the third element is: eliminating, from the third element, the common portion shared with the MAC address of the forwarding node corresponding to the third element, to obtain the compressed third element.

In an implementation, address information of forwarding nodes on the packet forwarding path is an address information set, address information of each forwarding node is one element, the address information set includes at least one first subset and the second element, each first subset includes at least two elements, a common prefix shared by the elements in the first subset is a prefix of the first subset, and the second element shares a common portion with a media access control MAC address of a forwarding node corresponding to each second element; and that different address compression manners are used for the first element and the second element includes: the first element belongs to a first subset; an address compression manner used for the first element is: eliminating, from the first element, a portion that is the same as a prefix of the first subset to which the first element belongs, to obtain the compressed first element; and an address compression manner used for the second element is: eliminating, from the second element, the common portion shared with the MAC address of the forwarding node corresponding to the second element, to obtain the compressed second element.

In an implementation, address information of forwarding nodes on the packet forwarding path is an address information set, address information of each forwarding node is one element, the address information set includes a second subset and the second element, the second subset includes at least one element, a prefix and prefix length of each element in the second subset are the same as those of address information of a source node or address information of a destination node, and the second element shares a common portion with a media access control MAC address of a forwarding node corresponding to each second element; and that different address compression manners are used for the first element and the second element includes: the first element belongs to the second subset; an address compression manner used for the first element is: eliminating, from the first element, a portion that is the same as the prefix of the address information of the source node, to obtain the compressed first element; or eliminating, from the first element, a portion that is the same as the prefix of the address information of the destination node, to obtain the compressed first element; and an address compression manner used for the second element is: eliminating, from the second element, the common portion shared with the MAC address of the forwarding node corresponding to the second element, to obtain the compressed second element.

In an implementation, the first indication field is further used to indicate a fourth element, and the fourth element is uncompressed address information of a forwarding node on the packet forwarding path.

In an implementation, the packet further includes a second indication field, and the second indication field is used to indicate address compression manners used for the elements indicated by the first indication field.

For example, the second indication field includes at least one first field, each first field corresponds to one address compression manner, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

For another example, the second indication field includes a second field and N first fields, where N is an integer greater than or equal to 1; the second field is used to indicate that a total of N address compression manners are used for the elements indicated by the first indication field; and each first field corresponds to one of the N address compression manners, one bit in each first field corresponds to one element indicated by the first indication field, and when the bit is a first value, it indicates that an address compression manner corresponding to the first field is used for the element corresponding to the bit, or when the bit is a second value, it indicates that an address compression manner corresponding to the first field is not used for the element corresponding to the bit.

For another example, the packet includes a second indication field corresponding to each element indicated by the first indication field, and the second indication field is used to indicate an address compression manner used for the corresponding element.

In an implementation, the packet further includes a third indication field, and the third indication field is used to indicate prefix information of each first subset. For example, the third indication field includes at least one third field, each third field corresponds to a prefix of one first subset, and each third field includes a first portion and a second portion, where the first portion of the third field is used to indicate a length of the prefix of the corresponding first subset, and the second portion of the third field is used to indicate the prefix of the corresponding first subset.

In an implementation, the first indication field includes at least one fourth field, and each fourth field corresponds to one element indicated by the first indication field; and when the element corresponding to the fourth field belongs to the first subset, the fourth field includes a first portion, a second portion, and a third portion, where the first portion of the fourth field is used to indicate a third field corresponding to a prefix of the first subset to which the element belongs, the second portion of the fourth field is used to indicate a length of a compressed element, and the third portion of the fourth field is used to indicate the compressed element; or when the element corresponding to the fourth field belongs to the second subset, the fourth field includes a first portion, a second portion, and a third portion, where the first portion of the fourth field is used to indicate an identifier of the address information of the source node whose prefix is the same as that of the second element or an identifier of the address information of the destination node whose prefix is the same as that of the second element, the second portion of the fourth field is used to indicate a length of a compressed element, and the third portion of the fourth field is used to indicate the compressed element; or when the element corresponding to the fourth field shares a common portion with a media access control MAC address of a forwarding node corresponding to the element, the fourth field includes a first portion and a second portion, where the first portion of the fourth field is used to indicate a length of a compressed element, and the second portion of the fourth field is used to indicate the compressed element.

In an implementation, the processing module 22 is specifically configured to: determine, based on the second indication field, an address compression manner used for the address information of the next forwarding node; and restore the address information of the next forwarding node based on the address compression manner used for the address information of the next forwarding node and compressed address information, of the next forwarding node, indicated by the first indication field. For example, the processing module 23 is specifically configured to: when the address information of the next forwarding node belongs to a first subset, add, to the front of the compressed address information of the next forwarding node based on the address compression manner used for the address information of the next forwarding node, prefix information that is indicated by the third indication field and that is of the first subset to which the address information of the next forwarding node belongs, to restore the address information of the next forwarding node; or when the address information of the next forwarding node belongs to the second subset, add, to the front of the compressed address information of the next forwarding node based on the address compression manner used for the address information of the next forwarding node, a common prefix shared by the address information of the next forwarding node and the address information of the source node or the address information of the destination node, to restore the address information of the next forwarding node; or when the address information of the next forwarding node shares a common portion with a media access control MAC address of the next forwarding node, add, to the compressed address information of the next forwarding node based on the address compression manner used for the address information of the next forwarding node, the common portion shared by the media access control MAC address of the next forwarding node and the address information of the next forwarding node, to restore the address information of the next forwarding node.

In an implementation, the packet further includes a fourth indication field, and the fourth indication field is used to indicate a start position of the third indication field in the packet.

In an implementation, the packet further includes a fifth indication field, and the fifth indication field is used to indicate a start position of a next element in the first indication field, where a node corresponding to the next element is a next node forwarding or receiving the packet on the packet forwarding path.

In an implementation, the packet further includes a sixth indication field, and the sixth indication field is used to indicate a type of the packet, where the type of the packet is used to indicate that the elements indicated by the first indication field include a compressed element.

The communications apparatus provided in this embodiment of this application can perform the actions on a forwarding node side receiving the packet in the foregoing method embodiment. An implementation principle and a technical effect of the communications apparatus are similar to those of the method embodiment. Details are not described herein again.

It should be noted that, it should be understood that the sending module may be a transmitter in actual implementation, the receiving module may be a receiver in actual implementation, and the processing module may be implemented by invoking software by a processing element, or may be implemented by hardware. For example, the processing module may be an independently disposed processing element, or may be integrated into a chip of the foregoing device for implementation. In addition, the processing module may be alternatively stored in a form of program code in a memory of the foregoing device, and be invoked by a processing element of the foregoing node to execute the foregoing functions of the processing module. In addition, all or some of the modules may be integrated, or may be implemented independently. The processing element described herein may be an integrated circuit with a signal processing capability. In an implementation process, the steps of the foregoing method or the foregoing modules may be implemented by using an integrated logic circuit of hardware in the processing element or by using a software-form instruction.

For example, the foregoing modules may be configured as one or more integrated circuits for implementing the foregoing method, such as one or more application-specific integrated circuits (ASIC), one or more microprocessors (DSP), or one or more field programmable gate arrays (FPGA). For another example, when one of the foregoing modules is implemented by invoking program code by a processing element, the processing element may be a general purpose processor, such as a central processing unit (CPU for short), or another processor that can invoke the program code. For still another example, the modules may be integrated, and implemented in a system-on-a-chip (SOC for short) form.

Figure 13:
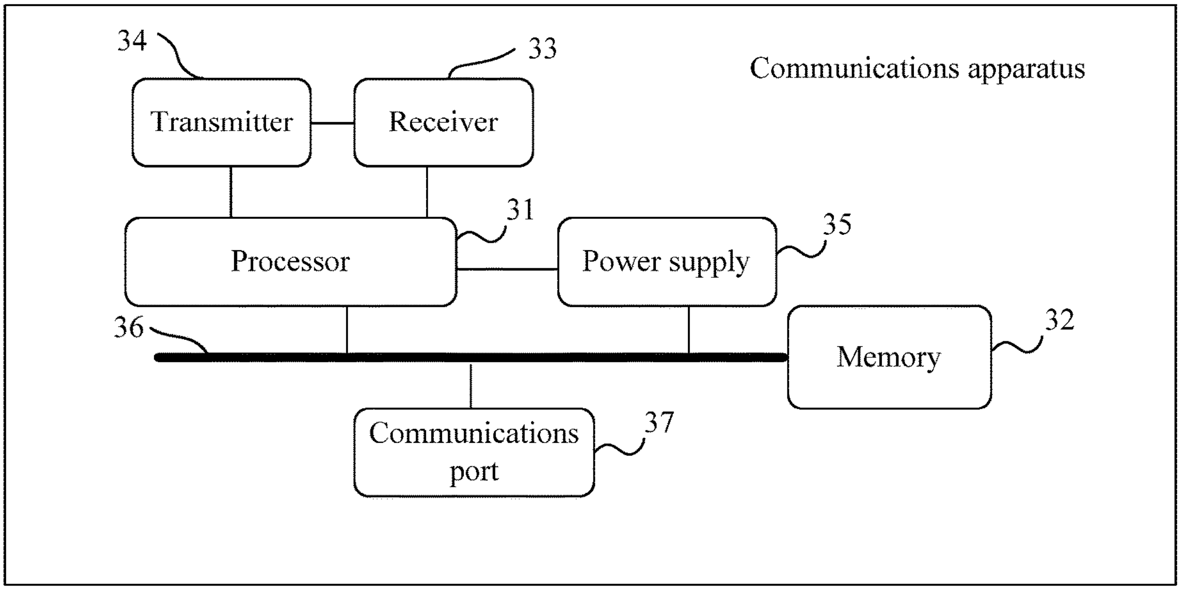
FIG. 13 is a schematic structural diagram of still another communications apparatus according to an embodiment of this application.

FIG. 13 is a schematic structural diagram of still another communications apparatus according to an embodiment of this application. As shown in FIG. 13, the communications apparatus may include a processor 31 (such as a CPU), a memory 32, and a transmitter 34. Optionally, the communications apparatus may further include a receiver 33. The receiver 33 and the transmitter 34 are both coupled to the processor 31, and the processor 31 controls receiving actions of the receiver 33 and sending actions of the transmitter 34. The memory 32 may include a high-speed random access memory (RAM), and may further include a non-volatile memory (NVM), for example, at least one magnetic disk storage. The memory 32 may store various instructions, for completing various processing functions and implementing the method steps in this application. Optionally, the communications apparatus in this application may further include a power supply 35, a communications bus 36, and a communications port 37. The receiver 33 and the transmitter 34 may be integrated into a transceiver of the communications apparatus, or may be a separate receive antenna and a separate transmit antenna of the communications apparatus. The communications bus 36 is configured to implement communication connection between components. The communications port 37 is configured to implement connection and communication between the communications apparatus and other peripherals.

In this embodiment of this application, the memory 32 is configured to store computer executable program code, where the program code includes an instruction. When the processor 31 executes the instruction, the instruction enables the processor 31 of the communications apparatus to perform a processing action of the compression node in the foregoing method embodiments, enables the receiver 33 to perform a receiving action of the compression node in the foregoing method embodiments, and enables the transmitter 34 to perform a sending action of the compression node in the foregoing method embodiments. Implementation principles and technical effects of the processor 31, the receiver 33, and the transmitter 34 are similar to those of the processing action, the receiving action, and the sending action, respectively. Details are not described herein again.

Figure 14:
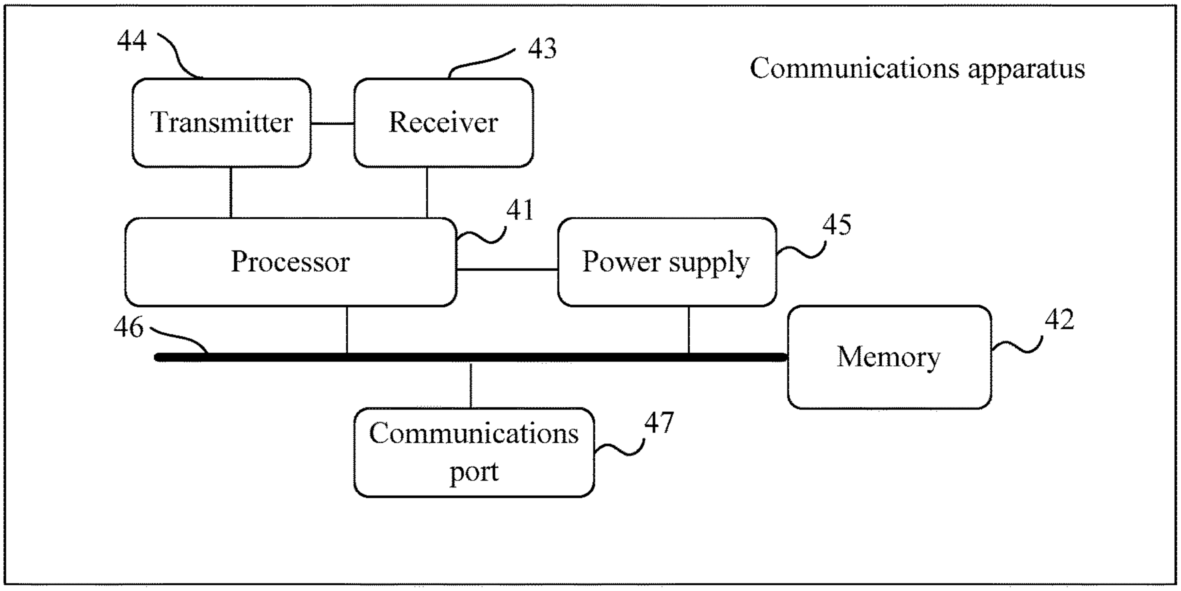
FIG. 14 is a schematic structural diagram of still another communications apparatus according to an embodiment of this application.

FIG. 14 is a schematic structural diagram of still another communications apparatus according to an embodiment of this application. As shown in FIG. 14, the communications apparatus may include a processor 41 (such as a CPU), a memory 42, a receiver 43, and a transmitter 44. The receiver 43 and the transmitter 44 are both coupled to the processor 41, and the processor 41 controls receiving actions of the receiver 43 and sending actions of the transmitter 44. The memory 42 may include a high-speed RAM memory, and may further include a non-volatile memory NVM, for example, at least one magnetic disk storage. The memory 42 may store various instructions, for completing various processing functions and implementing the method steps in this application. Optionally, the communications apparatus in this application may further include a power supply 45, a communications bus 46, and a communications port 47. The receiver 43 and the transmitter 44 may be integrated into a transceiver of the communications apparatus, or may be a separate receive antenna and a separate transmit antenna of the communications apparatus. The communications bus 46 is configured to implement communication connection between components. The communications port 47 is configured to implement connection and communication between the communications apparatus and other peripherals.

In this application, the memory 42 is configured to store computer executable program code, where the program code includes an instruction. When the processor 41 executes the instruction, the instruction enables the processor 41 of the communications apparatus to perform a processing action of the forwarding node receiving the packet in the foregoing method embodiments, enables the receiver 43 to perform a receiving action of the forwarding node receiving the packet in the foregoing method embodiments, and enables the transmitter 44 to perform a sending action of the forwarding node receiving the packet in the foregoing method embodiments. Implementation principles and technical effects of the processor 41, the receiver 43, and the transmitter 44 are similar to those of the processing action, the receiving action, and the sending action, respectively. Details are not described herein again.

Figure 15:
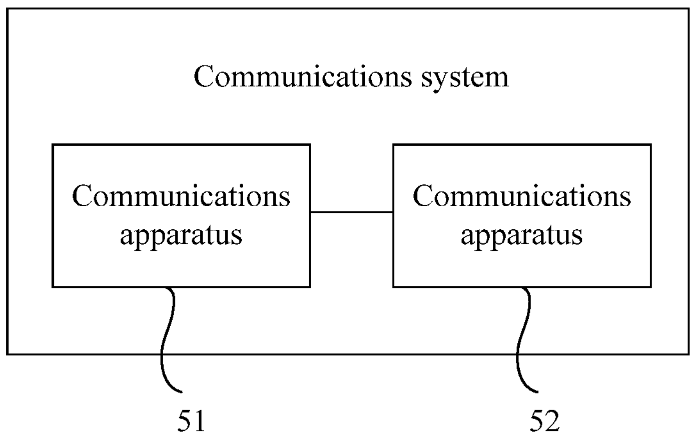
FIG. 15 is a schematic structural diagram of a communications system according to an embodiment of this application.

FIG. 15 is a schematic structural diagram of a communications system according to an embodiment of this application. As shown in FIG. 12, the communications system may include a communications apparatus 51 and a communications apparatus 52. The communications apparatus 51 may be the compression node in the foregoing embodiments, and the communications apparatus 52 may be any forwarding node receiving the packet in the foregoing embodiments. An implementation principle and a technical effect of the communications apparatus 51 are similar to those of the compression node, and an implementation principle and a technical effect of the communications apparatus 52 are similar to those of the forwarding node. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, through a coaxial cable, an optical fiber, or a digital subscriber line (digital subscriber line, DSL)) or wireless (for example, through infrared, radio, or microwave) manner. The computer-readable storage medium may be any usable medium that can be accessed by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

In this application, "a plurality of" means two or more than two. The term "and/or" in this specification describes merely an association relationship between associated objects and indicates that three relationships may exist. For example, A and/or B may represent the following three cases: Only A exists, both A and B exist, and only B exists. In addition, the character "/" in this specification usually indicates an "or" relationship between associated objects. In a formula, the character "/" represents a "division" relationship between associated objects.

It may be understood that numbers in the embodiments of this application are merely for differentiation for ease of description, and are not intended to limit the scope of the embodiments of this application.

It may be understood that in the embodiments of this application, sequence numbers of the foregoing processes do not indicate an execution sequence. An execution sequence of the processes should be determined based on functions and internal logic of the processes, but shall not constitute any limitation on an implementation process of the embodiments of this application.

What is claimed is:

1. A method, comprising:

generating a packet based on address information of forwarding nodes on a packet forwarding path, wherein the packet comprises a first indication field, the first indication field indicates a compressed first element and a compressed second element, the address information of the forwarding nodes on the packet forwarding path is an address information set, a first element comprises address information of a first forwarding node on the packet forwarding path, and a second element comprises address information of a second forwarding node on the packet forwarding path, the first forwarding node and the second forwarding node are different forwarding nodes, a first address compression manner is used to compress the first element to form the compressed first element, a second address compression manner is used to compress the second element to form the compressed second element, the first address compression manner is a different compression manner than the second address compression manner, the address information set comprises at least two first subsets, the first element and the second element correspond to different first subsets of the at least two first subsets, each first subset of the at least two first subsets comprises at least two elements of the respective first subset that share a common prefix, the common prefixes of the elements of different first subsets of the at least two first subsets are different; and sending the packet.

2. The method according to claim 1, wherein address information of each forwarding node on the packet forwarding path is one element in the address information set, and, in each first subset of the at least two subsets, a common prefix shared by the at least two elements in the respective first subset is a prefix of the respective first subset; and wherein the first address compression manner being used to compress the first element to form the compressed first element, the second address compression manner being used to compress the second element to form the compressed second element, and the first address compression manner being a different compression manner than the second address compression manner comprises:

a prefix of a first subset to which the first element belongs is different from a prefix of a first subset to which the second element belongs;

compressing the first element in the first address compression manner by eliminating, from the first element, a portion that is the same as the prefix of the first subset to which the first element belongs, to obtain the compressed first element; and compressing the second element in the second address compression manner by eliminating, from the second element, a portion that is the same as the prefix of the first subset to which the second element belongs, to obtain the compressed second element.

3. The method according to claim 2, wherein the packet further comprises a third indication field, and the third indication field indicates prefix information of each first subset of the at least two first subsets.

4. The method according to claim 3, wherein the third indication field comprises at least one third field, each third field of the at least one third field corresponds to a prefix of a first subset of the at least two first subsets, and each third field of the at least one third field comprises a first portion and a second portion, wherein for each third field the first portion of the respective third field indicates a length of the prefix of the corresponding first subset, and the second portion of the respective third field is indicates the prefix of the corresponding first subset.

5. The method according to claim 1, wherein address information of each forwarding node on the packet forwarding path is one element of the address information set, the address information set comprises a second subset and the at least two first subsets, the second subset comprises at least one third element, the at least one third element comprised in the second subset is different from the at least two elements comprised each first subset of the at least two first subsets, a common prefix shared by the at least two elements in each first subset of the at least two first subsets is a prefix of the respective first subset, and a prefix and prefix length of each third element in the second subset are respectively the same as a prefix and a prefix length of address information of a source node or address information of a destination node;

wherein the first address compression manner being used to compress the first element to form the compressed first element comprises compressing the first element in the first address compression manner by eliminating, from the first element, a portion that is the same as a prefix of the first subset to which the first element belongs, to obtain the compressed first element; and wherein the method further comprises compressing each third element by eliminating, from the respective third element, a portion that is the same as the prefix of the address information of the source node, to obtain a compressed third element; or eliminating, from the respective third element, a portion that is the same as the prefix of the address information of the destination node, to obtain a compressed third element.

6. The method according to claim 5, wherein the first indication field comprises at least one fourth field, and each fourth field of the at least one fourth field corresponds to a respective one element indicated by the first indication field; and wherein:

when the one element corresponding to a respective fourth field of the at least one fourth field belongs to a first subset of the at least two first subsets, the respective fourth field comprises a first portion, a second portion, and a third portion, wherein the first portion of the respective fourth field is indicates a third field corresponding to a prefix of the first subset to which the one element corresponding to the respective fourth field belongs, the second portion of the respective fourth field indicates a length of a compressed element corresponding to the one element, and the third portion of the respective fourth field indicates the compressed element corresponding to the one element; or when the one element corresponding to the respective fourth field belongs to the second subset, the respective fourth field comprises a first portion, a second portion, and a third portion, wherein the first portion of the respective fourth field indicates an identifier of the address information of the source node whose prefix is the same as that of a third element corresponding to the respective fourth field or an identifier of the address information of the destination node whose prefix is the same as that of the third element corresponding to the respective fourth field, the second portion of the respective fourth field indicates a length of a compressed element corresponding to the one element, and the third portion of the respective fourth field indicates the compressed element corresponding to the one element; or when the one element corresponding to the respective fourth field shares a common portion with a media access control (MAC) address of a forwarding node corresponding to the one element corresponding to the respective fourth field, the respective fourth field comprises a first portion and a second portion, wherein the first portion of the respective fourth field indicates a length of a compressed element corresponding to the one element, and the second portion of the respective fourth field indicates the compressed element corresponding to the one element.

7. The method according to claim 1, wherein the packet further comprises a second indication field, and the second indication field indicates the first address compression manner and the second address compression manner used to form the compressed first element and the compressed second element indicated by the first indication field.

8. The method according to claim 7, wherein:

the second indication field comprises a second field and N first fields, wherein N is an integer greater than or equal to 1;

the second field indicates that a total of N address compression manners are used to form compressed elements indicated by the first indication field; and each first field of the N first fields corresponds to a compression manner of the N address compression manners, one bit in each first field corresponds to an element indicated by the first indication field, and when the one bit of a respective first field is a first value, the one bit of the respective first field indicates that an address compression manner corresponding to the respective first field is used to form the compressed element corresponding to the one bit, or when the one bit of the respective first field is a second value, the one bit of the respective first field indicates that an address compression manner corresponding to the respective first field is not used to form the compressed element corresponding to the one bit.

9. A method, comprising:

receiving a packet, wherein the packet comprises a first indication field, the first indication field indicates a compressed first element and a compressed second element, a first element comprises address information of a first forwarding node on a packet forwarding path, and a second element comprises address information of a second forwarding node on the packet forwarding path, the first forwarding node and the second forwarding node are different forwarding nodes, a first address compression manner is used to compress the first element to form the compressed first element, a second address compression manner is used to compress the second element to form the compressed second element, the first address compression manner is a different compression manner than the second address compression manner, address information of forwarding nodes on the packet forwarding path is an address information set, the address information set comprises at least two first subsets, the first element and the second element correspond to different first subsets of the at least two first subsets, each first subset of the at least two first subsets comprises at least two elements of the respective first subset that share a common prefix, and the common prefixes of the elements of different first subsets of the at least two first subsets are different;

determining address information of a next forwarding node of the packet based on the first indication field; and sending the packet to the next forwarding node based on the address information of the next forwarding node.

10. The method according to claim 9, wherein address information of each forwarding node is one element of the address information set, and, in each first subset of the at least two subsets, a common prefix shared by the at least two elements in the respective first subset is a prefix of the respective first subset; and wherein the first address compression manner being used to compress the first element to form the compressed first element, the second address compression manner being used to compress the second element to form the compressed second element, and the first address compression manner being a different compression manner than the second address compression manner comprises:

a prefix of a first subset to which the first element belongs is different from a prefix of a first subset to which the second element belongs;

the first element being compressed using the first address compression manner by eliminating, from the first element, a portion that is the same as the prefix of the first subset to which the first element belongs, to obtain the compressed first element; and the second element being compressed using the second address compression manner by: eliminating, from the second element, a portion that is the same as the prefix of the first subset to which the second element belongs, to obtain the compressed second element.

11. The method according to claim 9, wherein address information of each forwarding node is one element of the address information set, the address information set comprises a second subset and the at least two first subsets, the second subset comprises at least one third element, the at least one third element comprised in the second subset is different from the at least two elements comprised in each first subset of the at least two first subsets, a common prefix shared by the at least two elements in each first subset of the at least two first subsets is a prefix of the respective first subset, and a prefix and prefix length of each element of the at least one third element in the second subset are the same as a prefix and prefix length of address information of a source node or address information of a destination node; and wherein the first address compression manner being used to compress the first element to form the compressed first element comprises the first element being compressed using the first address compression manner by eliminating, from the first element, a portion that is the same as a prefix of the first subset to which the first element belongs, to obtain the compressed first element; and wherein the at least one third element is compressed by eliminating, from each respective third element, a portion that is the same as the prefix of the address information of the source node, to obtain a compressed third element or eliminating, from each respective third element, a portion that is the same as the prefix of the address information of the destination node, to obtain a compressed third element.

12. The method according to claim 11, wherein the packet further comprises a third indication field, and the third indication field indicates prefix information of each first subset of the at least two first subsets.

13. The method according to claim 12, wherein the third indication field comprises at least one third field, each third field of the at least one third field corresponds to a prefix of one first subset of the at least two first subsets, and each third field of the at least one third field comprises a first portion and a second portion, wherein the first portion of each third field of the at least one third field indicates a length of the prefix of the corresponding first subset, and the second portion of each third field of the at least one third field indicates the prefix of the corresponding first subset.

14. The method according to claim 12, wherein determining the address information of the next forwarding node based on the first indication field comprises:

determining, based on a second indication field, an address compression manner used to compress the address information of the next forwarding node; and restoring the address information of the next forwarding node based on the address compression manner used to compress the address information of the next forwarding node and compressed address information, of the next forwarding node, indicated by the first indication field.

15. The method according to claim 14, wherein restoring the address information of the next forwarding node based on the address compression manner used to compress the address information of the next forwarding node and the compressed address information, of the next forwarding node, indicated by the first indication field comprises:

when the address information of the next forwarding node belongs to a first subset of the at least two first subsets, adding, to a front of the compressed address information of the next forwarding node based on the address compression manner used the address information of the next forwarding node, prefix information that is indicated by the third indication field and that is of the first subset to which the address information of the next forwarding node belongs, to restore the address information of the next forwarding node; or when the address information of the next forwarding node belongs to the second subset, adding, to the front of the compressed address information of the next forwarding node based on the address compression manner used to compress the address information of the next forwarding node, the common prefix shared by the address information of the next forwarding node and the address information of the source node or the address information of the destination node, to restore the address information of the next forwarding node; or when the address information of the next forwarding node shares a common portion with a media access control (MAC) address of the next forwarding node, adding, to the compressed address information of the next forwarding node based on the address compression manner used for the address information of the next forwarding node, the common portion shared by the MAC address of the next forwarding node and the address information of the next forwarding node, to restore the address information of the next forwarding node.

16. The method according to claim 11, wherein the first indication field comprises at least one fourth field, and each fourth field of the at least one fourth field corresponds to an element indicated by the first indication field; and wherein:

when the element corresponding to a respective fourth field belongs to the first subset, the respective fourth field comprises a first portion, a second portion, and a third portion, wherein the first portion of the respective fourth field indicates a third field corresponding to a prefix of the first subset to which the element corresponding to the respective fourth field belongs, the second portion of the respective fourth field indicates a length of a compressed element corresponding to the respective fourth field, and the third portion of the respective fourth field indicates the compressed element corresponding to the respective fourth field; or when the element corresponding to the respective fourth field belongs to the second subset, the respective fourth field comprises a first portion, a second portion, and a third portion, wherein the first portion of the respective fourth field indicates an identifier of the address information of the source node whose prefix is the same as that of a respective third element corresponding to the respective fourth field or an identifier of the address information of the destination node whose prefix is the same as that of a respective third element corresponding to the respective fourth field, the second portion of the respective fourth field indicates a length of a compressed element corresponding to the respective fourth field, and the third portion of the respective fourth field indicates the compressed element corresponding to the respective fourth field; or when the element corresponding to the respective fourth field shares a common portion with a media access control (MAC) address of a forwarding node corresponding to the element corresponding to the respective fourth field, the respective fourth field comprises a first portion and a second portion, wherein the first portion of the respective fourth field indicates a length of a compressed element corresponding to the respective fourth field, and the second portion of the respective fourth field indicates the compressed element corresponding to the respective fourth field.

17. The method according to claim 9, wherein the packet further comprises a second indication field, and the second indication field indicates the first address compression manner and the second address compression manner used to form the compressed first element and the compressed second element indicated by the first indication field.

18. The method according to claim 17, wherein:

the second indication field comprises a second field and N first fields, wherein N is an integer greater than or equal to 1;

the second field indicates that a total of N address compression manners are used to form compressed elements indicated by the first indication field; and each first field of the N first fields corresponds to an address compression manner of the N address compression manners, one bit in each first field corresponds to an element indicated by the first indication field, and when one bit of a respective first field is a first value, the one bit indicates that an address compression manner corresponding to the respective first field is used to form the compressed element corresponding to the one bit, or when the one bit of the respective first field is a second value, the one bit indicates that an address compression manner corresponding to the respective first field is not used to form the compressed element corresponding to the one bit of the respective first field.

19. An apparatus, comprising:

a processor, configured to generate a packet based on address information of forwarding nodes on a packet forwarding path, wherein the address information of the forwarding nodes on the packet forwarding path is an address information set, the packet comprises a first indication field, the first indication field indicates a compressed first element and a compressed second element, a first element comprises address information of a first forwarding node on the packet forwarding path, and a second element comprises address information of a second forwarding node on the packet forwarding path, the first forwarding node and the second forwarding node are different forwarding nodes, a first address compression manner is used to compress the first element to form the compressed first element, a second address compression manner is used to compress the second element to form the compressed second element, the first address compression manner is a different compression manner than the second address compression manner, the address information set comprises at least two first subsets, the first element and the second element correspond to different first subsets of the at least two first subsets, each first subset of the at least two first subsets comprises at least two elements of the respective subset that share a common prefix, and the common prefixes of the elements of different first subsets of the at least two first subsets are different; and a transmitter, configured to send the packet.

20. The apparatus according to claim 19, wherein address information of each forwarding node is one element of the address information set, and, for each first subset of the at least two first subsets, a common prefix shared by the at least two elements in the respective first subset is a prefix of the respective first subset; and wherein the first address compression manner being used to compress the first element to form the compressed first element, the second address compression manner being used to compress the second element to form the compressed second element, and the first address compression manner being a different compression manner than the second address compression manner comprises:

the first element and the second element belong to different first subsets, and a prefix of a first subset to which the first element belongs is different from a prefix of a first subset to which the second element belongs;

compressing the first element using the first address compression manner by eliminating, from the first element, a portion that is the same as the prefix of the first subset to which the first element belongs, to obtain the compressed first element; and compressing the second element using the second address compression manner by eliminating, from the second element, a portion that is the same as the prefix of the first subset to which the second element belongs, to obtain the compressed second element.

* * * * *